United States Patent
Gopalakrishnan

(10) Patent No.: US 8,341,255 B2
(45) Date of Patent: Dec. 25, 2012

(54) MANAGING NETWORK TRAFFIC BY EDITING A MANIFEST FILE

(75) Inventor: Kumar Gopalakrishnan, Mountain View, CA (US)

(73) Assignee: Unwired Planet, Inc., Redwood City, CA (US)

( * ) Notice: Subject to any disclaimer, the term of this patent is extended or adjusted under 35 U.S.C. 154(b) by 211 days.

(21) Appl. No.: 12/899,463

(22) Filed: Oct. 6, 2010

(65) Prior Publication Data

US 2011/0082924 A1 Apr. 7, 2011

Related U.S. Application Data

(60) Provisional application No. 61/249,166, filed on Oct. 6, 2009.

(51) Int. Cl.
*G06F 15/16* (2006.01)
*G06F 13/38* (2006.01)

(52) U.S. Cl. ........ 709/223; 709/231; 709/203; 709/218; 709/202; 709/217; 709/200; 709/201

(58) Field of Classification Search .......... 709/200–203, 709/217–220, 231, 223
See application file for complete search history.

(56) References Cited

U.S. PATENT DOCUMENTS

| | | | |
|---|---|---|---|
| 6,314,451 B1 * | 11/2001 | Landsman et al. | 709/203 |
| 6,466,967 B2 * | 10/2002 | Landsman et al. | 709/203 |
| 6,687,737 B2 * | 2/2004 | Landsman et al. | 709/203 |
| 2002/0099785 A1 | 7/2002 | Teeple | |
| 2002/0120666 A1 * | 8/2002 | Landsman et al. | 709/200 |
| 2002/0129102 A1 * | 9/2002 | Landsman et al. | 709/203 |
| 2003/0145038 A1 | 7/2003 | Tariq et al. | |
| 2003/0204613 A1 | 10/2003 | Hudson et al. | |
| 2004/0078293 A1 | 4/2004 | Iverson et al. | |
| 2004/0098748 A1 | 5/2004 | Bo et al. | |
| 2007/0133405 A1 | 6/2007 | Bowra et al. | |
| 2008/0133830 A1 | 6/2008 | Nitta et al. | |
| 2009/0094377 A1 | 4/2009 | Zahavi et al. | |
| 2009/0157834 A1 | 6/2009 | Aswamy | |
| 2009/0196218 A1 | 8/2009 | Pulini et al. | |
| 2009/0210631 A1 | 8/2009 | Bosworth et al. | |
| 2009/0254657 A1 | 10/2009 | Melnyk et al. | |
| 2010/0034089 A1 | 2/2010 | Kovvali et al. | |
| 2010/0034218 A1 | 2/2010 | Kovvali et al. | |
| 2010/0057883 A1 | 3/2010 | Cao et al. | |
| 2010/0158026 A1 | 6/2010 | Valmikam et al. | |

OTHER PUBLICATIONS

Enhua Tan, Lei Guo, Songqing Chen, and Xiaodong Zhang, "SCAP: Smart Caching in Wireless Access Points to Improve P2P Streaming", Proceedings of the 27th International Conference on Distributed Computing Systems (IEEE ICDCS 2007), Toronto, Canada, Jun. 25-29, 2007.

Alex Zambelli, "IIS Smooth Streaming Technical Overview", Windows Server Internet Information Services 7.0, Microsoft Corporation, Mar. 2009.

(Continued)

*Primary Examiner* — Jude Jean Gilles

(57) ABSTRACT

A technique for controlling the streaming of content through a network is disclosed. In an embodiment, the technique involves editing the manifest file that is used to implement an HTTP adaptive bit rate streaming protocol. For example, a manifest file is received at an intermediate network device in response to a request from a client for a content element, the manifest file is then edited at the intermediate network device, and then the edited manifest file is sent to the client. In an embodiment, editing the manifest file involves deleting and/or inserting a URI within the manifest file.

11 Claims, 12 Drawing Sheets

OTHER PUBLICATIONS

R. Pantos, Ed., "HTTP Live Streaming", Informational Internet-Draft, Apple, Inc., Jun. 8, 2009.

Urs Niesen, Devavrat Shah, Gregory Wornell, "Caching in Wireless Networks", Aug. 13, 2009.

* cited by examiner

MANAGING NETWORK TRAFFIC BY EDITING A MANIFEST FILE

CROSS-REFERENCE TO RELATED APPLICATION

This application is entitled to the benefit of provisional U.S. Patent Application Ser. No. 61/249,166, filed Oct. 6, 2010, which is incorporated by reference herein.

FIELD OF THE INVENTION

The present disclosure is related to the management of traffic in a communication network where some of the network elements are implemented with wireless technology. Aspects of the disclosure relate to efficient transport of groups of data (e.g., data packets) through such a communication network.

BACKGROUND

Modern wireless networks support data traffic on an equal footing with voice traffic. The data capabilities of wireless networks enable a variety of devices including mobile phones, laptop computers and other consumer electronics devices to access and use data services in a mobile environment. As the number of individuals using wireless devices, the number of wireless devices used by an individual, the frequency of use of the wireless devices and the capabilities of the wireless devices increase, the volume of data transported over wireless networks increases exponentially.

Data traffic over wireless networks also has a number of other characteristics that affect the manner and ability of the networks to transport data. For instance, the content contributing to a majority of the traffic is polarized in terms of popularity across users and over time, i.e., a small subset of the content available on the network contributes to a significant share of the overall traffic. More traffic flows in the downstream direction than flows in the upstream direction. Certain components of the traffic, such as video, yield to a variable quality of experience. Certain components of the traffic such as voice have strict requirements on the network quality of service. Further, wireless network operators may employ business models appropriate to different usage patterns. Aspects of the present disclosure can be useful for addressing these various needs and for providing a solution for efficient transport of the data traffic over wireless networks. While the present disclosure is not necessarily limited to such aspects, the instant disclosure may be appreciated through a discussion of examples using these and other contexts.

SUMMARY

Techniques for controlling the streaming of content through a network are disclosed. The techniques are especially applicable to the streaming of video content to hand-held wireless devices using an HTTP adaptive bit rate streaming protocol. In an embodiment, a technique for controlling the streaming of content involves changing the rate at which content chunks are sent from an intermediate network device in order to cause a client to request content chunks that are encoded at a different bit rate. For example, an intermediate network device can reduce the rate at which content chunks are sent to a client in order to cause the client to adapt to the reduced flow rate by requesting content chunks that are encoded at a lower bit rate. Causing a client to request content chunks that are encoded at a lower bit rate can reduce the bandwidth demand in a wireless communications network. Accordingly, the technique provides the operator of a wireless communications network (e.g., a wireless service provider) with a valuable tool to control network traffic volumes. The technique is also transparent to the client and to the content source and does not require any additional hardware or software to be installed at the content provider or at the client beyond what is already necessary to implement an HTTP adaptive bit rate streaming protocol.

In another embodiment, a technique for controlling the streaming of content involves editing the manifest file that is used to implement an HTTP adaptive bit rate streaming protocol. For example, a manifest file is received at an intermediate network device in response to a request from a client for a content element, the manifest file is then edited at the intermediate network device, and then the edited manifest file is sent to the client. In an embodiment, editing the manifest file involves deleting and/or inserting a Uniform Resource Identifier (URI) within the manifest file. For example, a URI that identifies a version of the content element that is encoded at a relatively high bit rate can be deleted from the manifest file so that the client does not have the option of requesting the high bit rate version of the content element. In another example, a URI that identifies a version of the content element that is encoded at a relatively low bit rate can be inserted into the manifest file so that the client has the option of requesting the low bit rate version of the content element. In still another example, a network operator such as a wireless service provider may insert a new URI into the manifest file that identifies a version of the content element that has been optimized by the network operator for streaming to the client. Having the ability to edit the manifest file at an intermediate network device enables the network operator, such as a wireless service provider, to have some control over the versions of content elements that are streamed to the clients. Accordingly, the technique provides the network operator, such as a wireless service provider, with a valuable tool to control network traffic volumes. The technique is also transparent to the client and to the content source and does not require any additional hardware or software to be installed at the content provider or at the client beyond what is already necessary to implement an HTTP adaptive bit rate streaming protocol.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
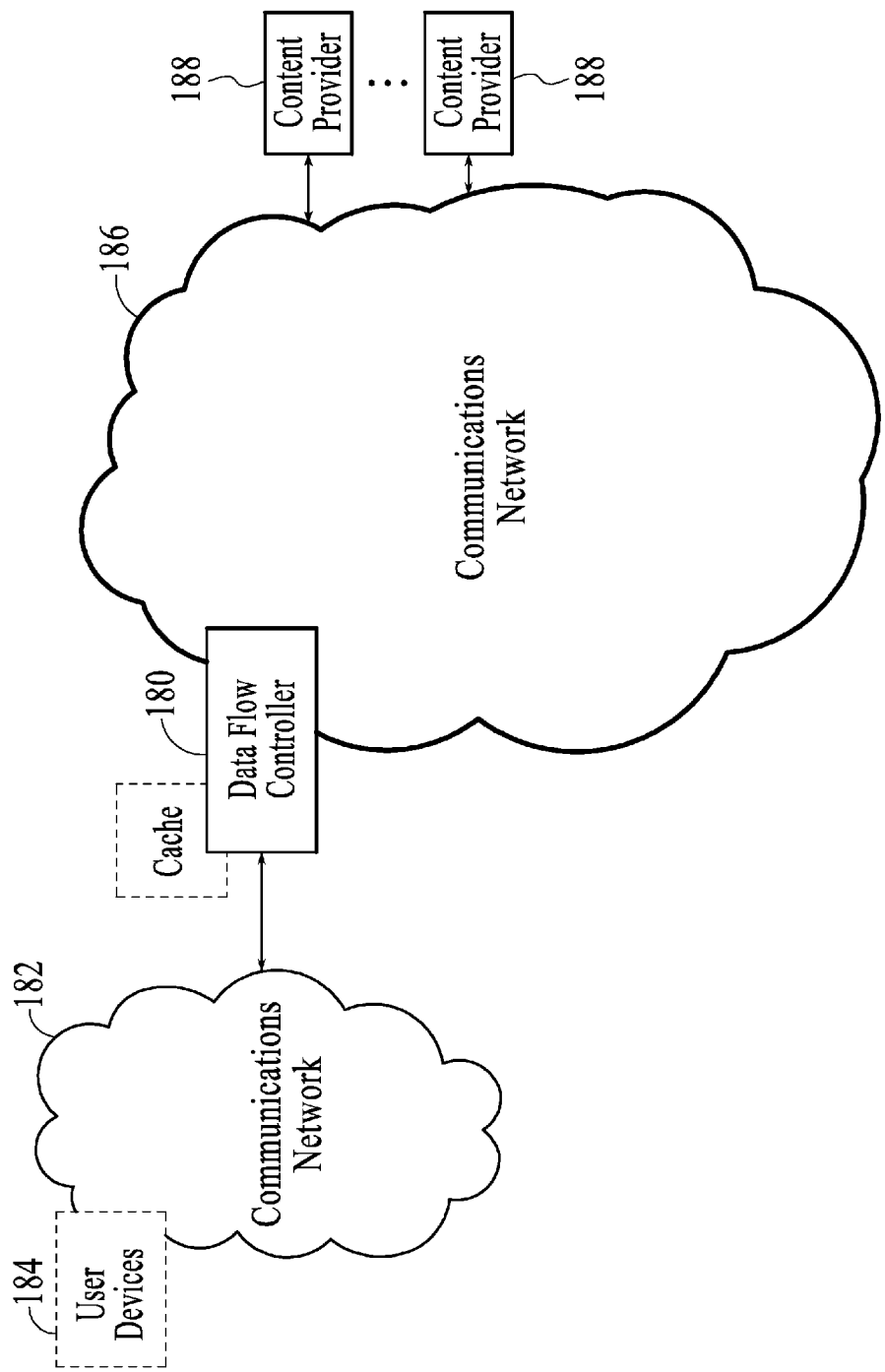
FIG. 1A depicts a block diagram of a system and various possible data-flow control configurations, consistent with embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

In accordance with various example embodiments, a wireless data network includes access networks in multiple geographies interconnected by a core network. The access network often includes a wireless link (e.g., in the last mile of the network) connecting user client devices to a radio transceiver with additional core network elements connecting the access network to the Internet backbone. The core network may employ wired or wireless technologies or a combination. In a particular implementation, the access network includes a femtocell that acts as the access network's transceiver with a user's broadband connection acting as the backhaul link to the core network and the Internet backbone. In another implementation, the access network is terminated by a wireless WAN router that has one or more client devices connected to it over a wired connection (e.g., 3G router) or a wireless connection (e.g., 3G WiFi router). The access and core networks together are operated by a wireless service provider that manages the network and charges users for the service.

Aspects of the present disclosure relate to optimizations of the data traffic in a wireless network through integration of additional processing and storage elements into the network. One such aspect of the disclosure is the use or addition of storage elements that act as data caches. These data caches can then be used to store data that is frequently accessed by users on the network. For instance, popular web pages and associated images may be cached so that repeat requests for the same web content can be served from the cache without incurring additional traffic through the entire network and onto the Internet backbone. Also, data uploaded from client devices to web sites or services on the Internet may be cached at the edges of the network with further transfer to upstream elements deferred to optimize upstream network traffic.

Cache storage may be incorporated into the network at various locations including datacenters in the core network, regional datacenters, metro networks, radio transceivers, femtocells, wireless WAN routers and client devices. Further, processes can be used to manage the distribution of data among the various cache storage elements. The management of the data in the cache storage elements may be motivated by (e.g., controlled using) the varying cost-performance metrics of the cache storage elements, policies and priorities for caching content as determined by the operators of the network, and observed and predicted content usage patterns. Further, content stored in cache storage elements inside a given datacenter or network edge location may also be managed to optimize the use of storage resources based on various operational parameters.

A particular implementation of the present disclosure uses a "cloud cache", i.e., a common cache storage that may be shared across wireless networks. Such a cloud cache may be hosted in datacenter in the Internet and serve as a central store of data that is distributed to cache stores located inside various wireless networks.

In one embodiment of the present disclosure, the identification of content to be stored in the cache storage elements, the duration of the storage of the content, the distribution of the content between various cache storage elements and the time schedule of distribution of the content to various cache storage elements may be driven by one or more context parameters. Context parameters may include a number of different aspects, as discussed in more detail herein.

Consistent with another embodiment, content may be identified for storage in the cache storage elements using one of 3 mechanisms: the system monitors the traffic flowing through the network to identify content worth storing in the cache storage elements; the content owner explicitly specifies the content to be loaded into the cache storage; or the system relies on statistics provided by a third party such as the content provider. In the latter 2 cases, the system may proactively retrieve and store the content (e.g., content identified as frequently accessed) into the cache storage elements.

One aspect of the disclosure relates to the use of network traffic control to manage the flow of data in the network. This may be realized by embedding network processing elements in various network elements in the network. For instance, data that is being uploaded through the network to a website or service may be blocked, delayed or throttled. Blocking traffic disrupts the user activity driving the network usage and forces the responsibility of handling the network connectivity interruption on the user or the user's application/service. Blocking may be accomplished by terminating a request for TCP connection. Delaying traffic postpones data traffic to a future time. This may be motivated by congestion in the network at a given time or by operator defined policies. Delaying may be accomplished by blocking initial requests for communication followed by allowing the communication to proceed at a later time based on pre-defined policies or observed increase in network availability. Throttling slows down traffic in a network allowing the user to continue use of the network but at a reduced throughput. Throttling may be accomplished by delaying the transmission of TCP SYN packets in the case of a TCP/IP network effectively simulating a lower available bandwidth. Blocking, Delaying and Throttling may be implemented using a combination of client device and network element functionality. The client device component of the functionality may be implemented with a native client resident on the client device or an embedded client delivered as part of the data stream for execution in a browser environment.

Yet another mechanism involves allowing partial download of content. The remaining portions of the content can then be scheduled for download at a later time. The user can be notified that the content is on a delayed schedule and provided with an indication of an estimated completion time. In some instances, the user can have the option of choosing a faster download. This option can be part of a one-time billing feature (per download) or as a higher level of service (monthly fee).

Further, the rationale for blocking, delaying and throttling of traffic flows may be governed by contexts created from one or more context parameters as in the case of cache management.

One aspect of the disclosure includes the use of network traffic management in cases where a real-time live data stream needs to be transported through the network. For example, in the case of a video stream on the downlink being consumed by a number of users simultaneously, the network may employ multicasting on the wired links up until the base station followed by single casting over the radio link. In some embodiments, the downstream traffic may be converted for transport over radio broadcast/multicast technologies such as MediaFlo or DVB-H.

Another multicasting-based embodiment is directed to using the delay mechanism discussed herein to allow synchronous multicasting of data downloads. This can be accomplished, for instance, by delaying downloads for a group of user devices until a specified time and then providing a multicast stream to the user devices. Yet another implementation is directed to using multicasting for pushing data to large number of devices. Multicast information can be sent to groups of devices, e.g., using a WAP push, SMS, MMS or the like, and the devices can respond by connecting to the multicast stream/radio channel. This can be particularly useful for sending emergency information, targeted advertising or even software updates to a large group of user devices.

Other aspects of the disclosure allow for the use of a peer-to-peer (P2P) caching and sharing. In such an implementation, the files can be shared between user devices directly (e.g., direct point-to-point connection via Bluetooth), through a local area network (LAN) or otherwise. This can be accomplished by, for instance, having the user devices store the content for a period of time. A list of available devices can be monitored and/or devices can be queried for the content. If a match is found, a data link can be established between user devices. This P2P aspect can be particularly useful when used in connection with partial downloads as different user devices capable of sharing files can be sent different portions of the files. The devices can then share these different portions without necessarily each receiving the full file from (a more centralized) cache storage location.

Moreover, the disclosure may also effect optimal use of network resources through influencing of other autonomous systems. For instance, in the case of video delivery systems where the network (bandwidth) utilization is automatically governed by the client and server, the network processing elements of the disclosure may throttle the traffic to force the client-server intelligence to change their network resource utilization. An example is the throttling of network traffic to effect an Adaptive Streaming client-server video solution to drop the video stream to a lower bit rate.

One aspect of the disclosure includes the use of processing elements to transform content being transferred through the network. Functions of the processing network include: media transformation, e.g., transcoding of multimedia content, rights management bridging e.g., DRM translation and license management and content enhancement e.g., insertion of advertisements into the content. The processing elements may be located in the core network, access network or as a shared resource common to multiple networks, i.e. a cloud processing element. For instance, a cloud processing element may transcode video content from an origin server into suitable formats and store it in the cloud cache. The content then gets transferred to cache storage elements in a wireless network as described earlier. However, if the content in an edge cache is not available in a format required for a specific client, the system may decide to transcode the content to the required format using processing elements at the edge.

Further, in the case of content being communicated upstream from the edge into the core of the network, a processing element present on the client may transcode the content to bit rates suitable to the available bandwidth in the network prior to transfer through the radio link. In other cases, processing elements present in the edge or core of the network may process the content prior to forwarding it to the destination.

Through its combination of caching, flow management and processing functions, aspects of the disclosure are particularly well suited to effectively manage traffic in the network, both in the upstream and downstream paths.

Aspects of the disclosure are directed to systems, circuitry, components, stored sets of instructions for execution by a computer, methods of using and implementing and populating network-enhancing equipment directed to and involving: management of data through a communication network having wireless-technology network elements that are configured to transfer data subject to bandwidth limits; receiving requests for data in the communication network; providing representative data, in response to the requests, from a cache communication-network location that stores and substantially represents the requested data based on a criteria that would provide an improved quality of experience or improved system bandwidth allocation in the communication network.

Another aspect of the disclosure is directed to data network management, where the network receives requests for data and in response thereto, limits access to representative data by denying, delaying and/or bandwidth throttling, based on a criterion that would provide an improved quality of experience or improved system bandwidth allocation in the communication network. In more specific embodiments, the representative data is cached at strategic nodes in the network. In certain implementations, the representative data can include video, image, audio or other suitable content.

Turning now to the figures, FIG. 1A depicts a block diagram for a data control module within a communication system, consistent with embodiments of the present disclosure. A data flow controller 180 controls the flow of data between user devices 184 and content providers 188. User devices 184 can be connected to the data flow controller through a communications network 182 (examples of suitable networks are provided herein). Content providers can be connected to the data flow controller through a communications network 186.

User devices 184 can request content from a website provider, the website provider representing an example of a content provider. In this context, the user devices can be individual endpoint devices, such as smartphones, laptop computers, pad computer, and the like. The disclosure, however, is not so limited. For instance, a smart phone can be a content provider for another smart phone.

Data flow controller 180 can provide various functions for controlling delivery of content to user devices 184. An example of such functions is limiting access to the content. Access can be limited in a number of different manners including, but not limited to, denial of content, delay in providing the content and/or throttling of the speed at which the content is provided. The selection and implementation of these functions can be implemented by monitoring a number of context parameters including, for instance, parameters that define the current state of the network. This allows for data flow controller 180 to actively respond to changing network conditions.

Other context parameters can include the overuse of one type of content relative to another. For instance, a new video clip may become popular to download causing heavy strain on network capabilities. This may cause adverse user experiences for a wide range of otherwise unrelated functions and/or content. Accordingly, the data flow controller can identify heavily accessed content and limit access thereto so as to allow for fair use of bandwidth between content providers and/or for critical content or services to remain available.

A particular type of context parameter relates to the origin of video content. From this context parameter, video content characteristics can be deduced including, for instance, user experience expectation, content source quality, content duration, content consumption patterns and content metadata.

The user experience expectation, content source quality, content duration based characteristics can be used to define specific encoding parameters for transcoding. For instance, some (e.g., YOUTUBE) content is often expected to play instantly, has low quality of capture and is less than 10 minutes in duration.

Content consumption patterns such as a) content popularity and b) content lifecycle (newness, expiration, etc.) and video content metadata such as the web page in which a video content is embedded provide data points for optimizing caching of the content.

In one implementation, a white list database of content origin URLs (and URL patterns) can be used to specify appropriate encoding and caching parameters. This database can be implemented as a continually evolving white list. The list can be manually managed or continually updated from a remote processing node. The database can be implemented with default classifications for URLs not in the white list.

These and other analytics can be statistically optimized based on content, target and channel characteristics, using continual analytics to update the statistical basis. The analytics generated include operational analytics on performance of the solution generated for carrier monitoring and refinement of the statistical basis for the solution. The analytic engine need not be a closed loop solution and can use logic and database updates to the statistical basis from an external processing source.

Another aspect relates to target profiling. Browser User Agent or equivalent identifiers can be used to maintain a database of target capabilities including 1) codecs supported, 2) network protocols supported, 3) network speeds supported, 4) screen dimensions and 5) screen resolution. The target capabilities can be used to derive transcoding and delivery parameters.

In an implementation, a database of the mapping of user agents to device capabilities needs to be maintained with continual updates as new devices enter the market.

A particular aspect relates to dynamic client channel-target profiling. A profiler application can reside and run at the target device. For instance, many laptop and smartphone browsers support, or soon will support, Flash content. A Flash based profiler can be inserted into web page content being delivered to the target by an intermediation solution. The Flash based profiler is executed inside the browser to generate real time metrics on the target including instantaneous target CPU performance, perceived bandwidth and availability of hardware acceleration. The Flash based profiler can be implemented to have a visible interface such as a footer at the bottom of the web page or can be face-less. Also, the Flash based profiler can be used to maintain real-time metrics on perceived bandwidth even when video is not presently being delivered to the target, for instance, on the home page of YouTube.

In another implementation, the Flash based profiler communicates with a high availability server for measuring bandwidth on a continual basis and reports measured data back to the Content Adaptation Engine. The Dynamic profiler can also be implemented as an ActiveX plugin or browser (e.g., FireFox) extension.

Another aspect relates to persistent client channel-target profiling. This aspect involves a persistent client that traps traffic on a laptop's network stack enables profiling of the channel and target irrespective of the protocols and applications used to deliver and present video content. A persistent client offers profiling across a wider range of applications at the cost of higher development cost, but may be necessitated by competition. In an implementation, the Persistent client will be integrated into the USB dongle/integrated 3G modem driver or management software.

The implementation of data flow controller 180 can take several forms and may involve using two or more such controllers 180. In one form, data flow controllers are distributed near the periphery of the network system, e.g., near the initial connection point of user devices 184. Each data flow controller 180 can monitor and assess network loading, content overuse and similar parameters (discussed in more detail herein). This can be particularly useful for providing data flow control that is tailored toward a particular data path. For instance, content can be device specific, geographically specific, language specific or otherwise tend to be unevenly accessed between different users. Thus, one data flow controller may see a very high rate of content access whereas another data flow controller sees very low rate of content access.

Other implementations use one or more centralized analysis devices to provide content control indicators to data flow controllers 180. This can be particularly useful for assessing and predicting content accesses across many different data paths.

In certain embodiments discussed in this disclosure, cache storage devices can be implemented for caching content. As discussed in connection with the data flow controllers 180, the location and control of the cache storage devices can vary.

For both access limitations and caching, tradeoffs exist between distributed and centralized storage and control and combinations thereof. Moreover, there are a number of different parameters that can be used in determining how the data flow controllers function.

Figure 1B:
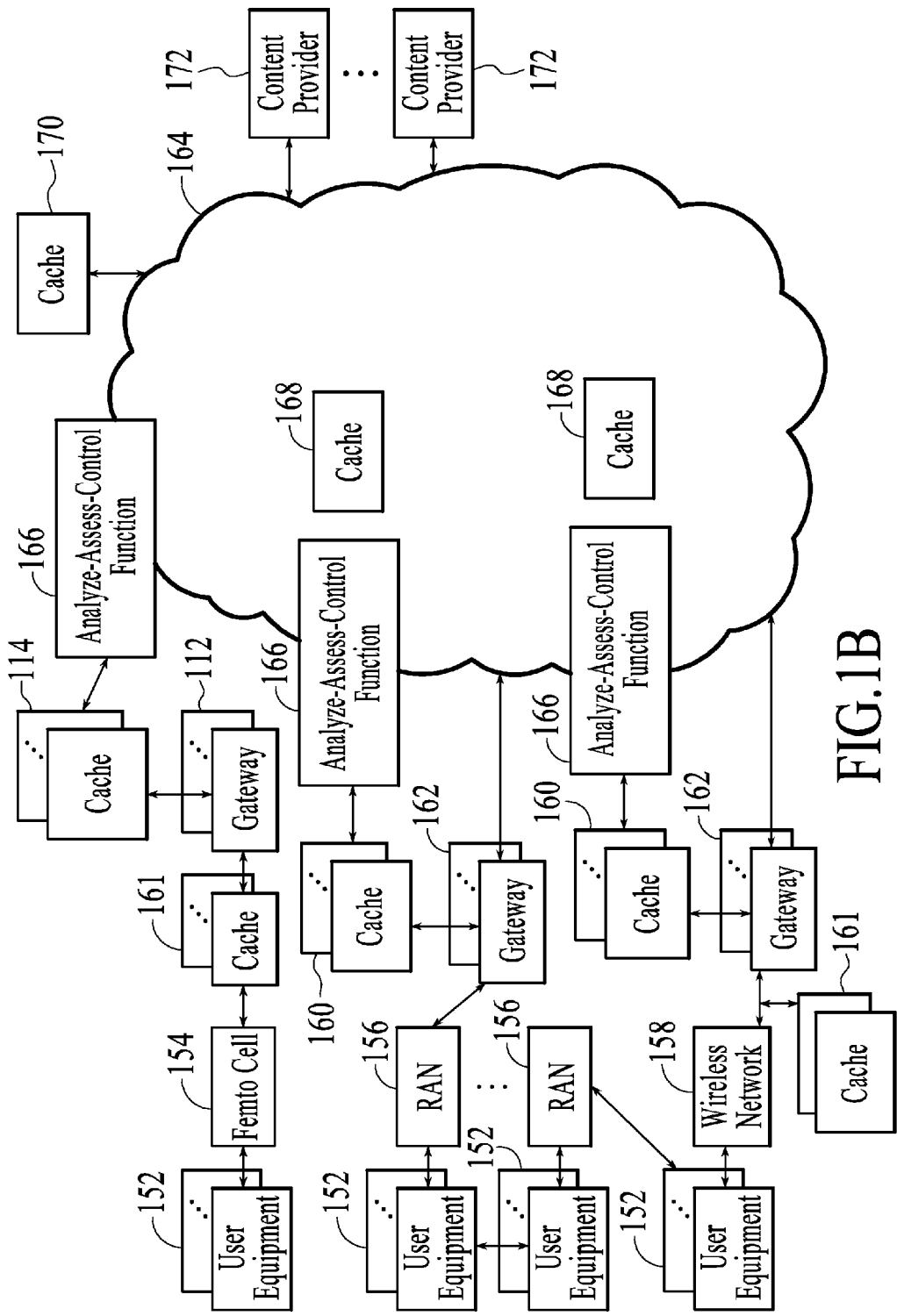
FIG. 1B depicts a block diagram of a system and various possible cache configurations, consistent with embodiments of the present disclosure.

FIG. 1B depicts a block diagram of a system and various possible cache configurations, consistent with an embodiment of the present disclosure. User devices 152 connect to content providers 172, to each other, or to other data sources through a variety of data paths. Non-limiting examples of user devices include cellular phones, smart phones, Personal Digital Assistants (PDA), handheld gaming devices, laptops, pad computers, home computers, and other devices that connect through wireless networks. For simplicity many components within the data path have been excluded from the diagram.

One example data path involves radio access networks (RANs) 156. The user device(s) 152 could be, for example, a smart phone connecting through a cellular communication scheme, such as Global System for Mobile communications (GSM), Universal Mobile Telecommunications System (UMTS), Code Division Multiple Access (CDMA) and communications protocols as defined by the 3$^{rd}$ Generation Partnership Project (3GPP) or the 3$^{rd}$ Generation Partnership Project 2 (3GPP2), 4G Long Term Evolution (LTE) and IEEE 802.16 standards bodies. These examples, however, are not limiting and aspects of the disclosure lend themselves to any number of connection protocols and mechanisms.

Gateways 162 can be used to connect between the RAN interface and another protocol, such as Internet-based protocols. For example, the gateway could translate data between the Wireless Application Protocol (WAP) protocol and the world-wide web protocols e.g., from various Internet protocols to Wireless Markup Language (WML). The data gateways can be configured to use GPRS Tunneling Protocol (GTP) to communicate with the radio access network. Other embodiments may use other communications protocols. Other conventional operations of the data gateways are known. For example, the data gateways enable users of mobile stations to roam between cells, for example, to move between different locations within the radio access network, by tracking the mobile station's identity across the network. The data gateway may also provide authentication and data formatting functions.

As shown in FIG. 1B, multiple RAN connection points (or cells) can use a common gateway. Also shown in the figure are various cache storage devices 160. In one embodiment the cache storage devices 160 can be located at the gateways 162. This allows for sharing of cache storage between multiple RANs. At the same time, there can be many gateways that are geographically (and logically) distributed around the cellular network and therefore the cache locations can be implemented with a relatively broad distribution.

Another example data path involves the use of femtocells 154. Femtocells are often implemented as a low power cellular base station that is connected to a cellular provider's network, often through a broadband connection (e.g., DSL or T1) link. Femtocells can be particularly useful for providing local cellular coverage to areas that otherwise have inadequate coverage, e.g., indoors.

For simplicity, many details of the data path are omitted as they can be implemented in a variety of manners. Often a gateway 162 provides an interface between user devices and another protocol, such as the Internet. This gateway 162 is a possible location for a cache storage device 160. The gateway can be located within a cellular provider's network and thereby shared (or similar to the gateway) with RAN-based data paths from larger/traditional cellular base stations. As another possibility, the cache storage device can be situated between the gateway and the user device. For example, the cache storage device can be located at the femtocell base station location. This can be particularly useful for controlling data bandwidth between the femtocell and the remainder of the network as this can be limited by the capacity of the broadband data link (sometimes shared with a variety of other devices).

A third data path uses wireless network interface 158 to connect and request data. This interface can be, for example, Worldwide Interoperability for Microwave Access (WiMax), 802.11x or the like. Thus, user devices can connect using wireless hotspots or other local networks. As before, the data path may include a gateway 162 at which a cache storage device 160 can be located. The gateway can sometimes be located at a cellular provider's location, but need not be so located.

Another possibility is for a cache storage device 160 to be located between the gateway and the user device. In this manner, a cache storage device 161 can be located at the wireless network interface 158.

A user device 152 can sometimes be simultaneously capable of connecting to multiple data paths. For instance, a user device 152 may be in range of a wireless hotspot whilst also having a connection to a 3G-type data interface. The decision on how to retrieve the necessary data can be made based upon a number of criteria, one of which can be whether or not the data resides in a cache of a particular data path.

Other locations for cache devices include within the core network 164, cache devices 168, or a cache device 170 at a central location. The central location can be implemented, for example, using an Internet accessible cache location. This can be particularly useful for offloading some of the downloading requirements from the content providers 172. For instance, a particularly popular video clip may result in the content providers 172 being unable to provide sufficient downlink bandwidth to service all incoming requests. By caching the popular video clip at location 170, at least some of the bandwidth can be offset. Moreover, the user experience for those users that have access to the caching features, consistent with aspects of the present disclosure, can therefore be improved relative to those without such access.

Other embodiments of the present disclosure relate to access-analyzing-control functions 166. These functions can be used to accurately and effectively control what content is cached as well as where the content is cached. A number of example criteria can be used in connection therewith. A few non-limiting examples are discussed hereafter.

One feature of embodiments of the present disclosure relates to the identification of content to be stored in the cache storage elements. This identification can be reactive and/or predictive. In a relatively simple implementation, the cache can store data in a FIFO fashion that stores recently accessed data and displaces data as new data is accessed. If a particular content is accessed multiple times before leaving the FIFO cache, it is provided from the cache and then be moved back to the front of the cache.

As another example of a reactive implementation, a network data analyzer identifies content that is being accessed in high-volume and that is consuming considerable bandwidth. The data can then be cached according to the network impact of storing in a particular cache storage device. The system can thereby prioritize what data is stored according to network impact. This can be particularly useful for maintaining high priority content in the cache.

Yet another reactive implementation involves receiving indications of media content's popularity from $3^{rd}$ parties, such as the content providers. This can be implemented using an indication of the number of requested downloads within a predefined time period or using more complex parameters and algorithms.

In a predictive example, the analyzer uses data to predict future network demands for content. This can include predicting downloads related to breaking news stories or detecting access patterns that indicate that particular content is likely to increase in usage. For instance, many video clips are accessed via a network effect in which as more users see the data the demand increases rapidly as the users forward or otherwise send the video clip to other users. Another example relates to sporting events in which a large group of people attempt to access content at approximately the same time, such as near the end of a game. Large news events, such as natural disasters, can also result in a spike in content requests for related information.

Another feature relates to determining how content is distributed between various cache storage elements. As shown in FIG. 1B, the cache storage elements can be located in a variety of locations. It should be noted that FIG. 1B is merely illustrative of example locations and that many other cache locations are contemplated. Determinations on where to store data can be made based upon numerous parameters. For instance, for a particular data path, the network analyzer can identify the most likely bottleneck for the data and chose to store the content accordingly. As another example, the analyzer might determine that certain content is related to a geographical area and thereby send the content to correspondingly located cache storage devices. Another possibility is that the content is associated with a particular type of device, e.g., smart phone application for a particular type of phone. This can also provide valuable information about where the content is best stored.

Accordingly, the various cache storage decisions can be based upon any number of different context parameters. A few examples may include user data, device characteristics, network characteristics, environmental factors and socio-cultural factors. Examples of user data include the data service price plan a user is subscribed to (e.g., premium vs. standard). Examples of device characteristics include screen size and supported audio and video codecs. Examples of network characteristics include network technology (e.g., HSPA, LTE), network topology (e.g., microwave vs. metro Ethernet backhaul) and available network capacity. Examples of environmental factors include time of day, location of sender and recipient and weather conditions. Examples of socio-cultural factors include holidays, sporting event schedules, etc. One or more of the context parameters may be combined to form a context which in turn is used to determine the management of the content in the cache storage elements. For instance, a video clip of breaking news may be automatically moved to cache storage elements nearer the edge of networks from the cloud cache or core network cache storage elements as the day breaks around the globe anticipating user requests for playback of the video clip.

Other aspects of the present disclosure allow for the use of multicasting in connection with a delay mechanism discussed herein. When a user device requests content that is highly-demanded and/or that consumes large amounts of bandwidth, access to the content can be delayed. Other user devices requesting the data are also delayed from access thereto. As part of the delay mechanism, the user devices are presented with information for connection to a multicast session. The user devices then connect to the same multicast session and receive the content therefrom. The to multicast session can be initiated for the group by presenting a synchronization time for the session to each of the user devices or can simply be periodically repeated (e.g., in the case of very-highly demanded content) thereby allowing devices to connect as necessary. Synchronization/multicast information can be sent as part of the delay mechanism through a variety of suitable mechanisms.

Yet another implementation is directed to using multicasting for pushing data to large number of devices. Multicast information (e.g., session initiation information) can be sent to groups of devices, e.g., using a WAP push, SMS, MMS or the like, and the devices can respond by connecting to the multicast stream/radio channel. This can be particularly useful for sending emergency information, targeted advertising or even software updates to a large group of user devices. The content can be cached and sent to groups of devices until all desired devices receive the content. This can allow for updates to be sent and received over time and to be sent to devices that may subsequently connect to the network.

Multicasting can be particularly useful for efficient use of radio signal bandwidth. For instance in a UMTS context, a group of mobile stations can be configured to listen to the packet notification channel (PNCH) on which a point to multipoint-multicast (PTM-M) notification is sent. Data can then be sent to the group of mobile stations using a shared packet data traffic channel (PDTCH).

Another aspect of the present disclosure relates to transcoding of content that is stored in data cache devices. Content received from a particular source is stored in a different form so as to facilitate transmission to user devices that requests the content. This transcoding can serve a number of different functions. For instance, a video or audio file can be transcoded from a particular file format (FLV, MPEG, AVI) to another format (3g2, 3gp, 3gp2, 3gpp). For instance, the content can be stored in form that reduces the size of the file through compression and/or other reduction techniques. The transcoding may also involve conversion to a file-format that is compatible with certain user device characteristics (e.g., mobile devices with limited display options). This can be both file format and/or display resolution.

Specific examples include transcoding of video content by changing the spatial and temporal resolution, changing the encoding bit rate, and/or changing the codec and/or codec parameters. In another embodiment, audio content can be transcoded by changing the sampling rate, changing the number of channels, changing the encoding bit rate, and/or changing the codec and/or the codec parameters. In another embodiment, image content can be transcoded by changing the spatial resolution, changing the bit depth, changing the encoding bit rate, and/or changing the codec and/or the codec parameters.

Yet another example of transcoding involves coordination between a content provider and the cache storage elements. The content provider may present multiple content choices that can be provided as a function of various context parameters. For instance, the content provider may have two video clip options that are to be provided as a function of available bandwidth, one video clip having a greater bit rate and/or fidelity than the other.

The content provider may also specify geographically-specific content associated with the same content request. In this manner, the provided content can be cached as different versions that are provided for different geographic locations, yet for the same content request.

Consistent with another embodiment, a user application can be installed/downloaded to a mobile station. The user application can facilitate the intelligent control and delivery of content to the device. For instance, the application provides configuration options for accessing/downloading content. In one embodiment, the application controls delivery options based upon content type and/or content source as determined by the user. This allows the user to specify which, if any, content is provided using aspects of the present disclosure (e.g., available caching locations or access limitations). Other aspects of the application allow a user to modify delivery settings dynamically. The user can use the application to route content delivery to e-mail, to delay delivery, to use bandwidth throttled, or to access a preferred/premium service which allows access to cache locations and similar functionality. This can be particularly useful for changing delivery options as may be desirable when a user is travelling and has limited access to other network resources (e.g., home computer access or email).

To implement such modifications, the application can modify content requests to denote user preferences (e.g., by modifying routing data for access request or adding preference indications thereby instructing how a remote should control content delivery). Alternatively, user profile data can be stored by a service provider. The application then updates the user profile data according to user preferences.

Access to user profile can also be provided via other interfaces, such as via a website.

As a particular example, the user may indicate that a first website contains content that is to be afforded a relatively low priority and for which delivery can be delayed or otherwise slowed. The user may indicate that another website is to be afforded high priority, and delivery should be prioritized. The cache/data control device(s) process access requests for each website accordingly. For billing purposes, the user may be charged a premium fee for the high priority accesses. As another example, when a mobile device requests access to content, the mobile device presents the user with a content delivery options. These options can be a priority indication and/or more detailed options, such as accepting delayed delivery for a reduced price and/or paying extra for access to a cached version. Other options include transcoding options, such as indicating the acceptability of different video resolutions or coding schemes.

These and other application can be implemented on mobile stations consistent with the present disclosures. The application includes programmed instructions that, when executed by a computer/processor, perform one or more of the methods and/or steps of the disclosure. The programmed instructions can be programmed on a computer readable medium including non-volatile or volatile memory circuitry.

Figure 2:
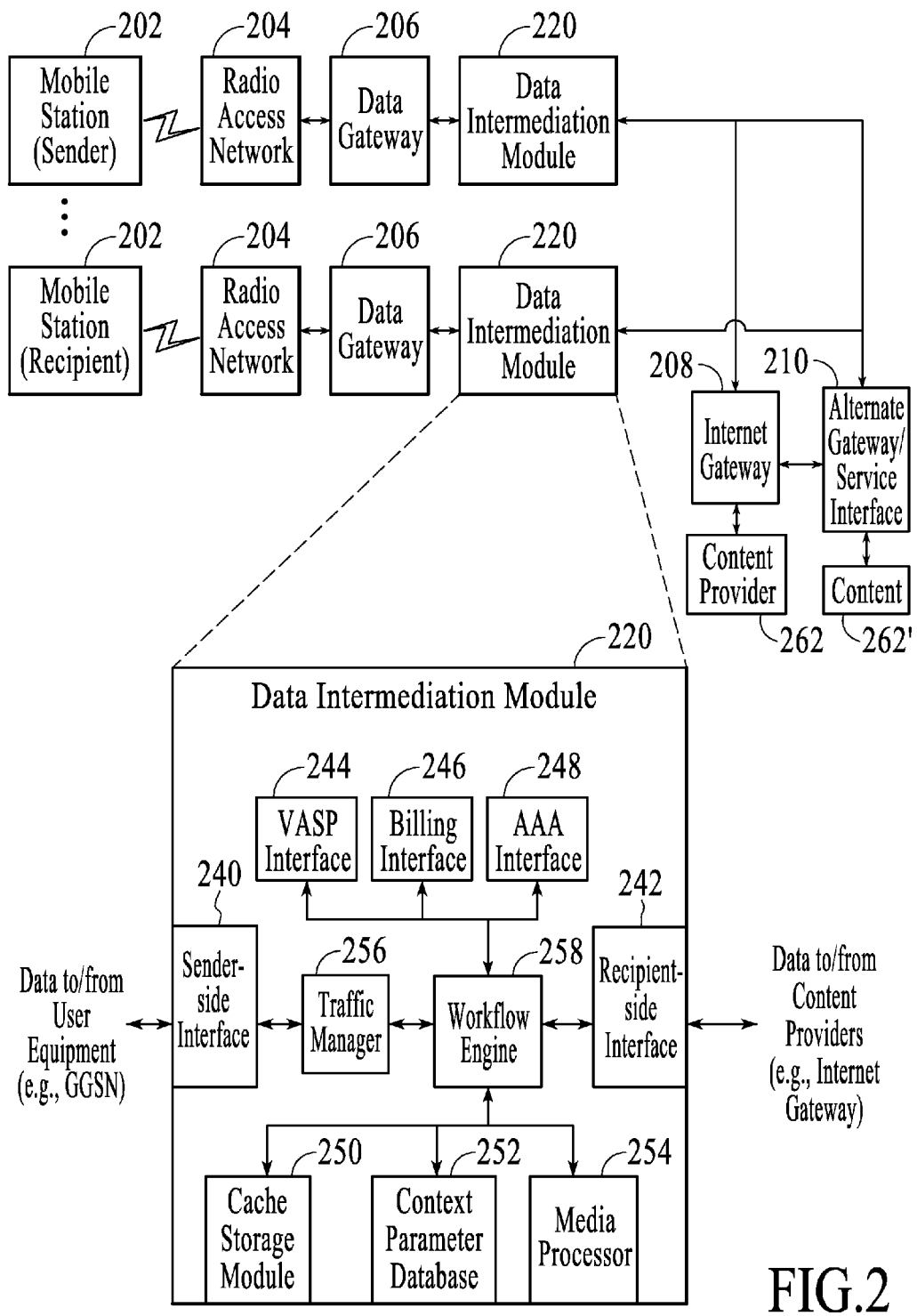
FIG. 2 shows a block diagram for data flow relative to content access by mobile devices, consistent with embodiments of the present disclosure.

As an example of a particular type of data flow, FIG. 2 shows a block diagram for data flow relative to content access by mobile devices, consistent with an embodiment of the present disclosure. The embodiment shown in FIG. 2 depicts a particular implementation that is useful for controlling data flow to one or more mobile stations or user devices. The system depicted in FIG. 2 includes mobile stations 202, radio access networks 204, data gateways 206, an Internet gateway 208, and data intermediation modules 220 which are used to illustrate an example structure for providing a cache functionality and/or access control of content. Although the system is depicted and described with certain components and functionality, other embodiments of the system may include fewer or more components to implement less or more functionality.

For description purposes, one of the mobile stations 202 requests multimedia, or other, content and one of the data intermediation modules 220 receives the requests. The mobile stations 202 can include handheld wireless devices, such as cell phones, mobile phones, smartphones, Personal Digital Assistants (PDA), pad computers, handheld gaming devices etc, that can wirelessly communicate using radio frequency (RF) communications signals.

In certain embodiments, the radio access networks 204 facilitate radio communications between the mobile stations 202 and a core network that includes the data gateways 206, the Internet gateways 208, and the data intermediation modules 220. In an embodiment, the radio access networks include one or more base stations to facilitate communications among the mobile stations that are within a communication range of the base stations. Each base station has at least one RF transceiver and the base stations communicate with the mobile stations using RF communication signals. The radio access network facilitates network communications among multiple mobile stations within the same radio access network and between mobile stations in other radio access networks and provides interfaces to facilitate communications with other entities, such as a Public Switched Telephone Network (PSTN), a Wide Area Network (WAN), the Internet, Internet servers, hosts, etc., which are outside of the radio access network. In an embodiment, the network elements depicted in FIGS. 1A, 1B and 1C are part of a wireless network that is operated by a single wireless service provider.

Data signals communicated between the mobile stations 202 and the radio access networks 204 include, but are not limited to, analog and/or digital RF signals (i.e., radio waves) for any type of communication mode, including text messaging, multimedia messaging, voice calling, and Internet browsing. The radio access network can support various different RF communications protocols, including without limitation, GSM, UMTS, CDMA, (mobile) WiMax and communications protocols as defined by 3GPP, 3GPP2, or IEEE 802.16. Although some wireless communications protocols are identified herein, it should be understood that present disclosure is not limited to the cited wireless communications protocols.

The data gateways 206 configure outgoing data access requests for use with one or more networks and configure incoming data for use by or display on a mobile station 202. As shown, each data gateway interfaces directly with a radio access network 204 and a data intermediation module 120, although other embodiments may include other intermediate functional elements.

The Internet gateway 208 provides a gateway for receiving data from content providers 262 (or optionally between mobile stations 202). The content providers 262 can be Internet-connected hosts and/or servers. For example, the Internet gateway can be a Wireless Application Protocol (WAP) gateway that converts the WAP protocol used by the radio access network to the Hypertext Transfer Protocol (HTTP) protocol used by the Internet. In an embodiment, the Internet gateway enables mobile stations to access multimedia content, such as Hyper Text Markup Language (HTML), compact HTML (cHTML), and extensible HTML (xHTML), which is stored on Internet-connected hosts and/or servers.

The disclosure is not limited to Internet communications and can be used in connection with various other networks and content sources as shown by alternative gateway/service 210. For instance, alternative gateway/service 210 can be a custom interface provided by a wireless service provider. The wireless service provider can use the custom interface to provide content to mobile devices. As an example, the content could be movies, applications, music, games or other downloadable data. The wireless service provider can store the content at one or more centralized locations and then distribute the content to cache locations as desired and discussed herein. Mobile device users can be charged for access to the content and at the same time realize an improved quality of experience due to intelligent caching and/or delivery of the content.

In a particular implementation of the disclosure, the wireless service provider can provide data content originating from other content providers. The other content providers purchase access to the caching/data control aspects of the present disclosure, thereby providing improved quality of experience for mobile users attempting to access their content.

The FCC may impose ("net neutrality") rules that would prohibit Internet service providers from slowing or blocking of information and certain applications over their networks. In this context, it should be noted that even for content that is allowed equal access to network bandwidth; however, subscribers to the intelligent data control of the instance disclosure can provide a higher quality of experience for their respective content.

With reference to FIG. 2, in a data acquisition process, a mobile station 202 generates a data request message (e.g., HTTP, SIP, RTP) that identifies a content provider and desired content (e.g., by entering a URL or other identifier). The data intermediation modules 220 can be located between gateways 206 on one side and the Internet gateway on the other side. In particular, each data intermediation module is functionally located in a data path that is between the respective data gateway on one side and the Internet gateway on the other side. In accordance with an embodiment of the disclosure, the data intermediation module 220 manages the flow of content between content providers and mobile stations. The modules can include, or have access to, a cache storage device for storing content.

In an embodiment, the data intermediation module 220 intercepts content requests that are sent from a mobile station and processes the requests to determine how to handle the content requests. This can include determining whether the requested data is present in the cache and/or performing various other functions that help to improve the performance of the system. For example, the data intermediation module 220 may perform any of the following functions:

1) limit access to content by a requesting mobile station;
  2) cache content for delayed delivery;
  3) optimize the content by transcoding thereof;
  4) provide content directly from the cache without retrieving the content through the Internet gateway; and
  5) forward content between data intermediation modules to preemptively populate caches with content.

In a particular embodiment, the content is part of streaming data that is accessible within the 3GPP end-to-end PS streaming service specification. Within this specification the content is transported using Real time Transport Protocol (RTP) over User Data Protocol (UDP). Session control/setup is implemented using Real Time Streaming Protocol (RTSP). For cached data, the streaming session can be effectively intercepted by streaming from the cached location instead of the indicated URL. The cache device can identify requests for streaming sessions for cached URL locations and thereby intercept the connection. This can be accomplished in a number of manners. For instance, connection information is sent to a requesting device using a session description protocol (SDP) file. In one instance, the SDP file can be adjusted based upon the existence of cache data. The adjustment can include changes due to transcoding and or connection information due to cache location.

In another embodiment, the content can include content (media or otherwise) that is accessible via OMA generic content download over-the-air specification. This can include either download with separate delivery of download descriptor and media object or download with co-delivery of descriptor and media object. The download descriptor contains information about a media object and instructions on how to download the content. The data flow control can thereby be effected by modifications to the download descriptor.

As a specific example a data network can involve multiple/disparate entities managing nodes/gateways or other content delivery elements. A content control device can initiate content delivery (streaming or otherwise) via a setup request. In a more particular embodiment, the content control device modifies the setup request as a function of the current cache state or other network parameters (such as subscriber relationship, content provider agreement or analytics applicable to network environment). In some instances, the modified request includes options for content delivery that can be acted upon by a downstream node or entity.

The data intermediation modules 220 can be particularly useful for improving the performance of live data content delivery by intelligent caching and data flow control. Caching and flow control decisions can be made based upon the status of cache storage devices at various locations. For instance, the data intermediation modules 220 can determine whether or not all or part of a particular requested content is already stored in a cache storage device near the recipient device. In this manner, the cached content can be retrieved from the data cache device and thereby not sent over the core network.

To facilitate this cache-based communication between data intermediation modules 220, a variety of messaging protocols can be used. For instance, the existence of multiple cache locations allows for content retrieval to occur between caches thereby alleviating the need to access the content provider directly. While not limiting, an example uses a central cache managing server to maintain a list of cached content for the various cache storage devices. A data intermediation module 220 checks with this managing server to determine whether the entire content needs to be transmitted as a function of the status of cache storage devices. In another example implementation, the data intermediation modules 220 communicate directly with one another.

These and other various communications can be implemented over the control protocols for telephonic devices. For instance, the cache checks can be sent within the signaling system 7 (SS7) protocol, thereby facilitating transmission across a number of different network platforms including, for instance, the PSTN. Other communication protocols are also possible. An example embodiment using such communication flow is discussed in more detail in regards to FIG. 3.

Additional improvements in performance can be achieved by processing the content to, for example, optimize the content and to provide value added services.

Each one of the data intermediation modules 220 (and/or associated cache storage devices) can be a standalone network element, such a distinct network node (e.g., a different "box") that is connected to the network by wired and/or fiber-optic network connections using network communications protocols such as Internet Protocol and Ethernet. Alternatively, each one of the data intermediation modules 220 may be integrated with one of the other network elements. For example, a data intermediation module may be located in the same "box" as one of the data gateways 106, the Internet gateway 108, or other components. Whether the data intermediation module 220 is physically located in a distinct physical network node or in the same network node as another network element, the functionality of the data intermediation module can be similar.

Use of a data intermediation module as described herein is applicable to different kinds of radio access networks, including, for example, 3GPP, 3GPP2, IEEE 802.16, and 4G radio access networks. For instance, radio access networks as defined by the 3GPP include a NodeB, a Radio Network Controller (RNC), a Serving General Packet Radio Service (GPRS) Support Node (SGSN), and a Gateway GPRS Support Node (GGSN). These nodes are discussed briefly as an example system, but the disclosure is not limited thereto.

A NodeB is a network element that performs base station functionality. A NodeB can use various communication protocols, such as Wideband Code Division Multiple Access (WCDMA)/Time Division Synchronous Code Division Multiple Access (TD-SCDMA), to communicate with the mobile stations. In an embodiment, each NodeB includes an RF transceiver that communicates with the mobile stations that are within a service area of the NodeB. In one embodiment, the NodeBs have a minimum amount of functionality and are controlled by an RNC. In another embodiment in which High Speed Downlink Packet Access (HSDPA) is used, some logic (e.g., retransmission) is handled by the NodeB to achieve shorter response times.

Each RNC is a network element that controls the connected NodeBs. In particular, the RNC is responsible for radio resource management and mobility management. The RNC is also the element that performs encryption before user data is sent to and from a mobile station. In an embodiment, radio resource management operations include outer loop power control, load control, admission control, packet scheduling, handover control, security functions, and mobility management. The Radio Network Controller may also various radio resource optimization operations.

Each SGSN is a network element that delivers packets to and from the mobile stations within a corresponding geographical service area. Functionality of the SGSN includes packet routing and transfer, mobility management (e.g., attach/detach and location management), logical link management, and authentication and billing. In an embodiment, the SGSN maintains a location register that stores location information, such as the current cell of a mobile station, and user profiles, such as International Mobile Subscriber Identity (IMSI) address used in the packet data network, of all GPRS mobile stations that are registered within the corresponding geographical service area of the SGSN.

Each GGSN is a network element that provides interworking between the GPRS network and external packet switched networks, such as the Internet and X.25 networks. In particular, the GGSN hides the GPRS infrastructure from the external networks. Functionality of the GGSN includes checking to see if specific mobile stations are active in the radio access network and forwarding data packets to the SGSN that is currently supporting a mobile station. The GGSN also converts GPRS packets coming from an SGSN into the needed packet data protocol format (e.g., Internet Protocol or X.25) and forwards packets to the appropriate external network. The GGSN is also responsible for IP address management/assignment and is the default router for the mobile stations. The GGSN may also implement Authentication, Authorization, and Accounting (AAA) and billing functions.

FIG. 2 also depicts a detailed example of a data intermediation module 220 in accordance with an embodiment of the disclosure. The data intermediation module 220 includes a sender-side interface 240, a recipient-side interface 242, a Value Added Service Provider (VASP) interface 244, a billing interface 246, an AAA interface 248, a cache storage module 250, a context parameter database 252, a media processor 254, a traffic manager 256, and a workflow engine 258. Without loss of generality, some of the content flow is discussed herein in terms of content received over the Internet; however, the data content could be provided via other suitable mechanisms and from other sources.

The sender-side interface 240 is an element of the data intermediation module 220 that provides an interface to the sender-side functional elements of the system and is the incoming interface for data content sent to the recipient-side mobile station. The recipient-side interface 242 is an element of the data intermediation module 220 that provides an interface to the recipient-side functional elements of the system and is the outgoing interface for data content destined for a recipient-side mobile station. In the embodiment of FIG. 2, the recipient-side interface is functionally adjacent to the (Internet) gateway or other network components (e.g., a MSF server), and the receiving data intermediation module.

The VASP interface 244 is an interface for value added service providers (e.g., service providers that are distinct from the content provider or the operator of the system and wireless communications network). In an embodiment, the value added service providers are third-party service providers that provide some additional service, functionality, or data to the system. In an embodiment, the VASP interface enables value added service providers to provide direct inputs to the data intermediation module related to, for example, sender parameters, recipient parameters, and optimization parameters.

The billing interface 246 of the data intermediation module provides an interface to a billing system or billing systems. In an embodiment, the billing interface enables the system to implement a billing program for data services. The billing system can also be used to bill content providers for access to cached content or for preferred content delivery features (e.g., enabling of RAN-based multicasting or reduced throttling). Content providers could request that certain content be cached and easily accessible, thereby improving the user experience for the cached content. The billing program could record such requests and charge content providers as a function of the number of cache requests, the number of accesses to the content, the bandwidth used by accesses to the content and the like.

Another implementation of a billing function relates to use of a centralized controller (or a hierarchy of multiple cache locations at various points within the network) for distributing content to multiple cache locations. Content providers can request distribution of content for improved access based upon defined parameters. These parameters can include, for instance, geographical location, type of wireless service available (e.g., 3G, WiMax), wireless service provider (e.g., AT&T, Verizon) or state/country boundaries. The billing can be accomplished using a centralized model, such as based upon the number of cache locations the content is to be loaded to, and/or a decentralized model where each cache location tracks usage and generates billing data therefrom. In yet another embodiment, a semi-centralized model involves two or more business entities coordinating and negotiating billing models and content delivery control/caching, bandwidth and quality factors. These and other aspects can thereby be used with various other parameters and content control functions.

Another implementation relating to billing methods involves a method of controlling delivery of source data content through a communication network including a wireless-technology network and another network. The wireless-technology network is controlled by a first business entity (e.g., data caching/flow control provider) and the other network is controlled by a second business entity (e.g., Internet Service Provider/content provider). In response to notification that source data content is to be routed through the communication network, control data representing data-delivery conditions agreed to between the first and second business entities is accessed. In response to and as a function of the control data, substantially redundant representations of the source data are directed to cache memories located at nodes in the wireless-technology network. The system delivers redundant representations of the source data from the cache memories to comply with the notification while effecting an improved quality of experience or improved system bandwidth allocation in the communication network. As a specific example of such a data network involving multiple/disparate entities managing nodes/gateways or other content delivery elements, the (streaming or otherwise) setup request is modified by one of the business entities to effect delivery as a function of the current cache state or other network parameters (such as subscriber relationship, content provider agreement or analytics applicable to network environment).

The AAA interface 248 of the data intermediation module provides an interface to authentication, access control, and accounting information and services.

The cache storage module 250 of the data intermediation module 220 provides storage for content (e.g., video, audio, website, messages). In an embodiment, the cache storage module enables the data intermediation module 220 to delay communication of content to other network elements when desired. Additionally, the cache storage modules can communicate with one another to allow for the data intermediation modules to implement an accelerated delivery mechanism by sending content directly between data intermediation modules without passing through an Internet gateway.

The context parameter database 252 of the data intermediation module provides a repository for context parameters that can be used to control content caching and/or delivery. In an embodiment, context parameters may include user data, device characteristics, network characteristics, environmental factors, and socio-cultural factors. Examples of user data include the messaging price plan a user is subscribed to (e.g., premium vs. standard), the age of the user, or the billing location of the user. Examples of device characteristics include the screen size and supported audio and video codecs of the mobile station. Examples of network characteristics include network technology (e.g., High Speed Packet Access (HSPA), LTE), network topology (e.g., microwave vs. metro Ethernet backhaul), and available network capacity. Examples of environmental factors include time of day, location of sender and recipient, and weather conditions. Examples of socio-cultural factors include holidays, sporting event schedules, etc. One or more of the context parameters may be combined to form context information that is used to determine how the data intermediation module processes content. For instance, content provided to a user having a standard rate price plan may not get priority treatment relative to when the system is congested due to a wild fire raging in the area.

The media processor 254 of the data intermediation module supports the processing of content to modify one or more aspects of the multimedia (and other) content. In one embodiment, the media processor transcodes the content. For instance, video content may be modified by changing the spatial and temporal resolution, changing the encoding bit rate, and/or changing the codec and/or codec parameters. In another embodiment, audio content may be changed by changing the sampling rate, changing the number of channels, changing the encoding bit rate, and/or changing the codec and/or the codec parameters. In another embodiment, image content may be changed by changing the spatial resolution, changing the bit depth, changing the encoding bit rate, and/or changing the codec and/or the codec parameters.

In another embodiment, the media processor 254 processes the content of to enhance the content. For example, the media processor may insert an advertisement in audio, video, image, or textual format into the content. In another embodiment, the media processor may convert textual symbols, such as emoticons, to an equivalent image representation.

The traffic manager 256 of the data intermediation module is configured to provide traffic management in the network. In an embodiment, the traffic manager can regulate the flow of content traffic between the functional elements of the system. For example, the when a mobile station requests content from a content provider, the traffic manager can regulate the data transfer rate by delaying or throttling back the transmission of the content. In an embodiment, the traffic manager can delay the transfer of content by terminating the Transmission Control Protocol (TCP) connection when a mobile station initiates the transfer process. In an embodiment, the traffic manager can throttle back the transfer of content by delaying the sending of TCP SYN packets from the data intermediation module to the mobile station while the content is being transferred. Other types of traffic management can be implemented by the traffic manager.

The workflow engine 258 of the data intermediation module is configured to process the content and, in response to the processing, to determine where/whether to cache the content. In an embodiment, the workflow engine determines where/whether the content currently resides relative to one or more cache locations. This determination can be used to decide how best to retrieve the content, such as whether to access the content provider through the Internet gateway or from another data intermediation module.

In one implementation, the workflow engine 258 can access resources from any of the traffic manager 256, the VASP interface 244, the billing interface 246, the AAA interface 248, the cache storage module 250, the context parameter database 252, and the media processor 254 in order to help make routing/caching/control decisions and any of the criteria described above with respect to the traffic manager, the VASP interface, the billing interface, the AAA interface, cache storage module, the context parameter database, and the media processor can be considered by the workflow engine. Additionally, the workflow engine may dictate how content is processed within the data intermediation node. For example, the workflow engine may specify a particular type of transcoding for the content based on the capabilities of the intended recipient-mobile station.

In a particular embodiment, a billing node may be located between the GGSN and the data intermediation module.

In other example embodiments, the communication network includes cache storage devices that are configured to communicate cache status/coherency using a built-in control structure. As one example, this control structure is implemented locally at the nodes at which caching is implemented. In another example, this control structure is implemented centrally (relative to two or more such nodes). In yet another example, this control structure is implemented based on both local and central control, thereby drawing from both of the above approaches.

Figure 3:
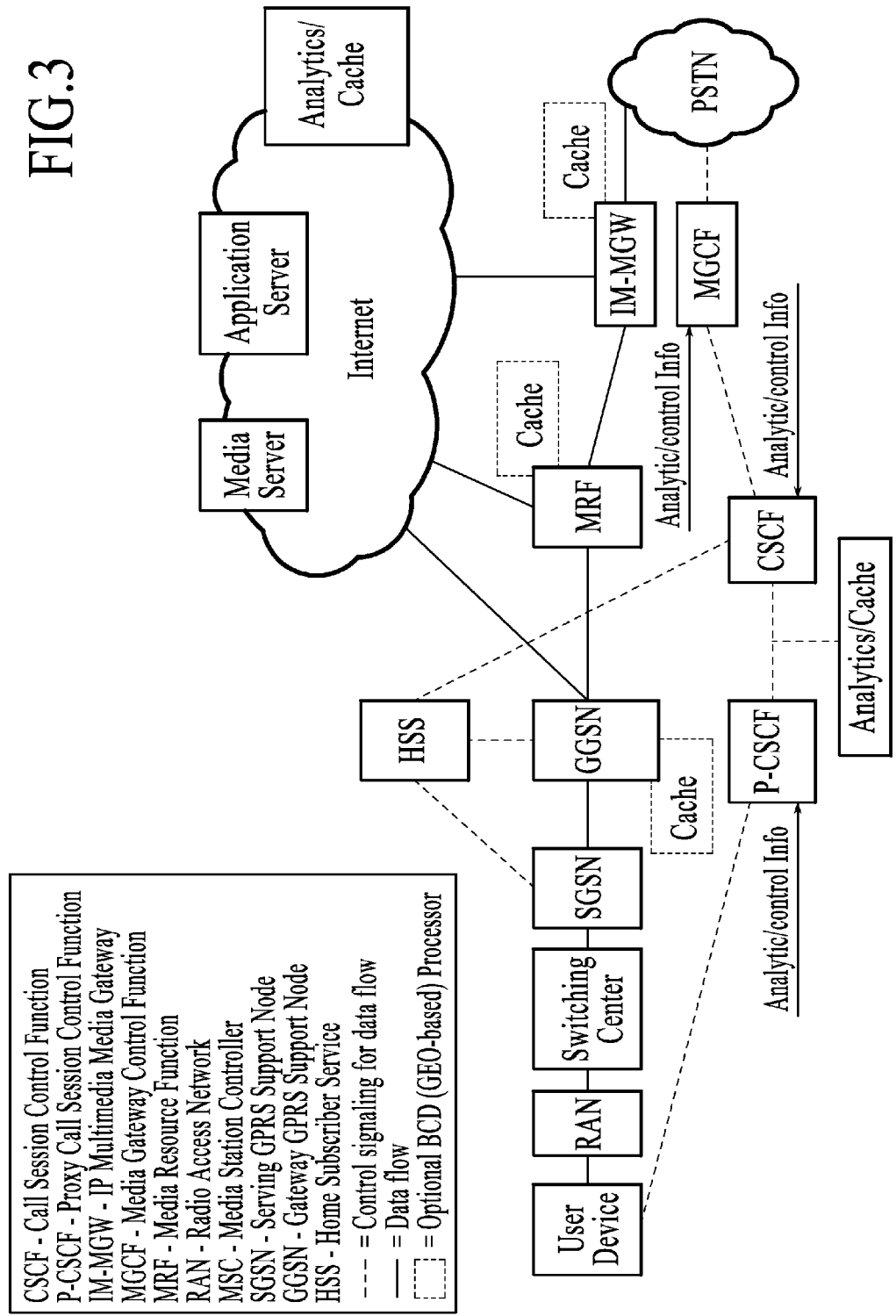
FIG. 3 depicts an example wireless network consistent with various cellular systems and embodiments of the present disclosure.

FIG. 3 depicts an example wireless network consistent with various cellular systems and an embodiment of the present disclosure. Data paths are indicated by solid connection lines and control paths are indicated by broken lines. As discussed herein, embodiments of the present disclosure allow for cache control to be implemented using existing control paths. If desired, the control data can be sent consistent with the SS7 and related control protocols. This allows for additional flexibility including backward compatibility across disparate systems. Moreover, since the existence of cached data may eliminate and/or reduce the necessity for an end-to-end data path between source and destination devices, the use of the control protocols can be particularly useful in determining this necessity before setting up data path(s).

For instance, a connection to a content provider might be established using HTTP or session-initiation-protocol (SIP). An intervening cache control server/device can check the status of various cache storage devices relative to the desired content indicated by the connection request. If the desired content is indeed cached, the intervening cache control server/device can intercept the connection request and establish a link with the cache storage device instead of the destination indicated by the requesting user/mobile device.

In various embodiments of the present disclosure, the cache storage devices operate to maintain synchronicity with content providers. In particular, content providers may change the content and thereby render the cached versions of the content out-of-date. The cache synchronicity can be maintained in a number of different manners. One mechanism involves periodically, or in response to user device requests, checking the version/status of the content at the content provider. If the content has changed, the version stored in the cache storage devices can be updated. Another mechanism is to allow for content providers to push new updates directly to the cache storage devices. This allows content providers to have more control over the content delivery, but may require more interaction with the content providers, e.g., establishment of preexisting protocols and other agreements.

A variety of processes (algorithms) can be implemented in connection with cache control and/or data flow control that are consistent with embodiments of the present disclosure. According to one such process, a control processor(s) is configured to access a database of context parameters. The particular parameters and their respective weight in the analysis can be selected according to a number of criteria. According to one such criterion, a lookup table of desired context parameters is indexed according to the content type. Content type can include such characterization as media type (e.g., video, audio or text), content source, real-time requirements (e.g., streaming/live data) and/or data size. The lookup table then provides a list of context parameters along with instructions on how to use the context parameters. The control processor can use these parameters to determine whether and/or where to cache the content. The control processor can also determine whether or not to limit access thereto.

In a particular implementation, the control processor assesses the cache by first rating the current content and then comparing the content rating to previously stored content. If the new/current content has a higher rating, then the control processor instructs the cache storage device to store the new content, which may displace some of the currently stored content.

The above-mentioned processes (algorithms) show the diversity and wide ranging application of embodiments of the present disclosures and therefore are not meant to be limiting. Variations of the above-discussed embodiments, for example, are based on combinations of the disclosed aspects as set forth above and/or in the provisional claims that follow. Variations of the embodiments may be employed for wireless communication networks based on 3G (e.g. CDMA, UMTS, HSPA, HSPA+) or 4G (e.g. WiMax, LTE, LTE-Advanced) standards.

Various embodiments described above, in the Figures and related discussion may be implemented together and/or in other manners. One or more of the elements depicted in the drawings/figures can also be implemented in a more separated or integrated manner, or removed, as is useful in accordance with particular applications. It is also within the spirit and scope to implement a program or code that can be stored in a machine-readable medium to permit a computer to perform one or more aspects of the approaches described above, such as those involving the storage and retrieval of data. In view of the description herein, those skilled in the art will recognize that many changes may be made thereto without departing from the spirit and scope of the present disclosure.

Video content can be delivered over the Internet using various different techniques.

UDP Streaming

UDP Streaming is the basis for RTSP and MMS protocols. UDP streaming works great with less reliable networks, offers a built-in quality degradation mechanism, supports multi-casting, supports content protection and supports playback controls. However, firewall conflicts for UDP data and cheaper higher-reliability networks have made UDP streaming less preferable. RTSP stacks are widely deployed in mobile phones and PC video solutions.

HTTP Progressive Download (HTTP-PD)

Cheap broadband connectivity and HTTP servers have enabled Flash video to explode. However, HTTP-PD conventionally does not offer quality degradation mechanisms, multi-casting, content protection, or playback controls. As the demand for higher fidelity video pushes the capacity of networks, the limitations of HTTP-PD are being exposed. One key issue with HTTP-PD is that the entire video content is downloaded even if video playback is stopped halfway.

TCP Streaming

ADOBE promoted Real Time Messaging Protocol (RTMP) as a means to combine the benefits of UDP streaming and TCP ubiquity. RTMP is used by several large video sites such as FACEBOOK. The RTMP protocol has been published recently and RTMP servers are commercially available.

HTTP Streaming

HTTP Streaming builds on top of HTTP-PD by adding byte array based random seeking in the video stream. This allows for player controls but content protection and lack of quality degradation support continue. YOUTUBE has been known to use HTTP streaming.

HTTP Adaptive Bit Rate Streaming

Also known as Adaptive Streaming, Dynamic Streaming, Smooth Streaming and HTTP Live Streaming, HTTP adaptive bit rate streaming is emerging as the default for delivering video. Some HTTP based adaptive streaming protocols include ADOBE HTTP Dynamic Streaming, APPLE HTTP Live Streaming, and MICROSOFT Internet Information Service (IIS) Smooth Streaming, a.k.a. "Silverlight." In HTTP adaptive bit rate streaming, video content is split into "segments" or "chunks" of 2-10 seconds and each segment is delivered in response to a separate HTTP request. Further, the video segments may also be encoded at different bit rates enabling the client to request segments of appropriate quality (bit rate) based on prevailing network conditions as the video is being played, thus enabling "adaptation" of playback quality to bandwidth availability. The segmentation also naturally enables seeking to parts of the video without having to download the entire video file. Content protection schemes are also being proposed. HTTP adaptive bit rate streaming is especially applicable to wireless communications networks because the capabilities of wireless communications networks, hand-held wireless devices, and the quality of wireless connections tend to vary widely.

Playback using an HTTP adaptive bit rate streaming protocol begins with the client requesting a manifest file, whose URL is typically embedded in the parent web page. The manifest file specifies the template URLs for segments of the video streams at each bit rate and may be referred to in some HTTP adaptive bit rate streaming protocols as a "playlist file" or a "variant playlist file." In general, the manifest file is a file that includes URIs (e.g., URLs) to identify the location of corresponding content. Once the manifest file is received, the client requests appropriate segments (based on the playback location in the video sequence) of the appropriate bit rate content (based on the rate at which the client is receiving the video data) in a sequence as the playout progresses.

Figure 4:
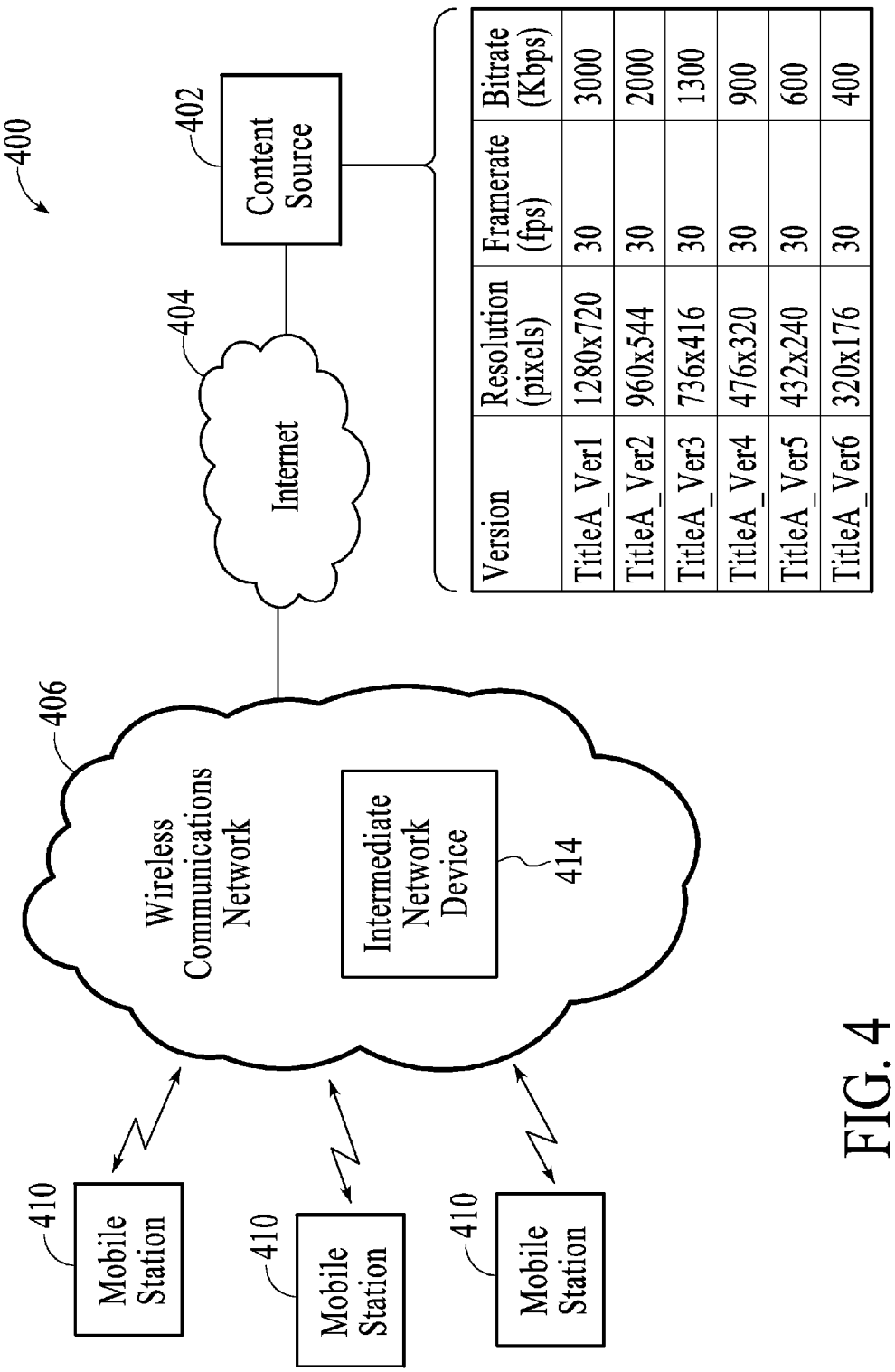
FIG. 4 depicts a system that includes a content source, the Internet, a wireless communications network, and mobile stations.

FIG. 4 depicts a system 400 that includes a content source 402, the Internet 404, a wireless communications network 406, and mobile stations 410. The system is configured to enable video streaming from the content source to the mobile stations using HTTP adaptive bit rate streaming. In the embodiment of FIG. 4, the content source stores content elements such as video or audio files and is able to stream the content elements clients. For example, the content source is a server that streams content to the mobile stations using HTTP adaptive bit rate streaming.

The wireless communications network 406 is, for example, a wireless communications network as described with reference to FIGS. 1-3. The wireless communications network includes an intermediate network device 414 as is described in more detail below. The mobile stations 410 are end user devices that receive content elements from the content source 402. The mobile stations can be, for example, wireless devices such as smartphones, PDAs, laptops, and pad computers. In an embodiment, the mobile stations include a client, such as a software-based application that is configured to implement an HTTP adaptive bit rate streaming protocol. In addition to mobile stations, end user devices may include "wired" devices such as desktop computers, set-top-boxes (STBs), and Internet equipped displays that are configured to implement an HTTP adaptive bit rate streaming protocol. Likewise, a wired communications network may be used instead of or in addition to the wireless communications network. Throughout the description, the term "client" refers to an end user device that is configured to access content elements using an HTTP adaptive bit rate streaming protocol.

In an embodiment, the content source 402 stores content elements that can be accessed by client. For description purposes, a content element refers to a time sequential set of digital data that is meant to be played out as a single element and that can be identified by a title. For example, a content element is an entity of video data that can be identified by a title, e.g., "game highlights," "birthday party," "news clip," Movie A" or an entity of audio data that can be identified by a title, e.g., "song A." Although examples of titles are provided, the titles can also be more abstract strings of letters, numbers, and/or symbols. The size of a content element depends on, for example, the play length of the content element, the encoding technique, the resolution of the content, the data format, and the richness of the media.

In an embodiment, a content element can be stored in various different versions. For example, a content element can be encoded for playout at different resolutions. A feature of HTTP adaptive bit rate streaming is that the client can select from different versions of the same content element and can adapt to certain operating parameters to change the selected version. In an embodiment, the client monitors operating parameters such as chunk download times, buffer fullness, and rendered frame rates to decide whether or not to request a different version of the content element for the next content chunk. In this way, each client makes its own decision as to what version of the content element to select and the decision can be changed to adapt to changes in operating parameters.

FIG. 4 depicts a content element, referred to as "Title A" that is stored at the content source. In the example of FIG. 4, the content element is video content that is stored in six different versions, referred to as "TitleA_Ver1," "TitleA_Ver2," "TitleA_Ver3," "TitleA_Ver4," "TitleA_Ver5," and "TitleA_Ver6." The different versions are encoded to have corresponding resolutions (in pixels), frame rates (in frames per second), and bit rates (in kilobits per second) as indicated in the table.

Figure 5:
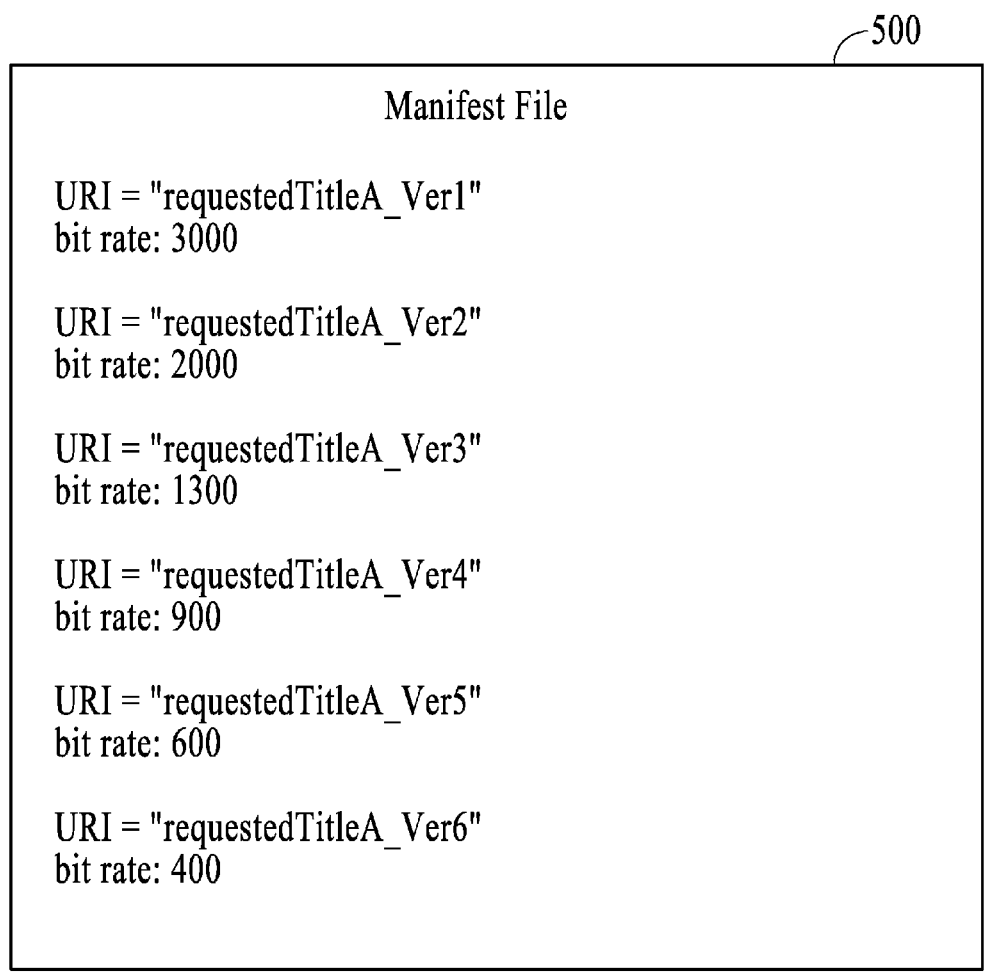
FIG. 5 depicts a manifest file that identifies all of the versions of Title A that are stored in the content source as shown in FIG. 4.

According to an HTTP adaptive bit rate streaming protocol, when a client requests a content element (e.g., by clicking on a corresponding HTTP link), the content source returns a manifest file. The manifest file includes at least one URI (e.g., as a URL) that identifies how/where to locate the corresponding content element. When more than one version of the content element is available, the manifest file includes a URI for each of the different versions. FIG. 5 depicts a manifest file 500 that identifies all of the versions of Title A that are stored in the content source as shown in FIG. 4. The manifest file may also include additional information about the content element and about the different versions of the content element such as the bit rate of the content element, the codecs used to encode the versions, video resolutions, markers, and captions.

In an embodiment, a technique for controlling the streaming of content involves changing the rate at which content chunks are sent from an intermediate network device in order to cause a client to request content chunks that are encoded at a different bit rate. For example, an intermediate network device can reduce the rate at which content chunks are sent to a client in order to cause the client to adapt to the reduced flow rate by requesting content chunks that are encoded at a lower bit rate.

Causing a client to request content chunks that are encoded at a lower bit rate can reduce the bandwidth demand in a wireless communications network. Accordingly, the technique provides the operator of a wireless communications network (e.g., a wireless service provider) with a valuable tool to control network traffic volumes. The technique is also transparent to the client and to the content source and does not require any additional hardware or software to be installed at the content provider or at the client beyond what is already necessary to implement an HTTP adaptive bit rate streaming protocol.

Figure 6:
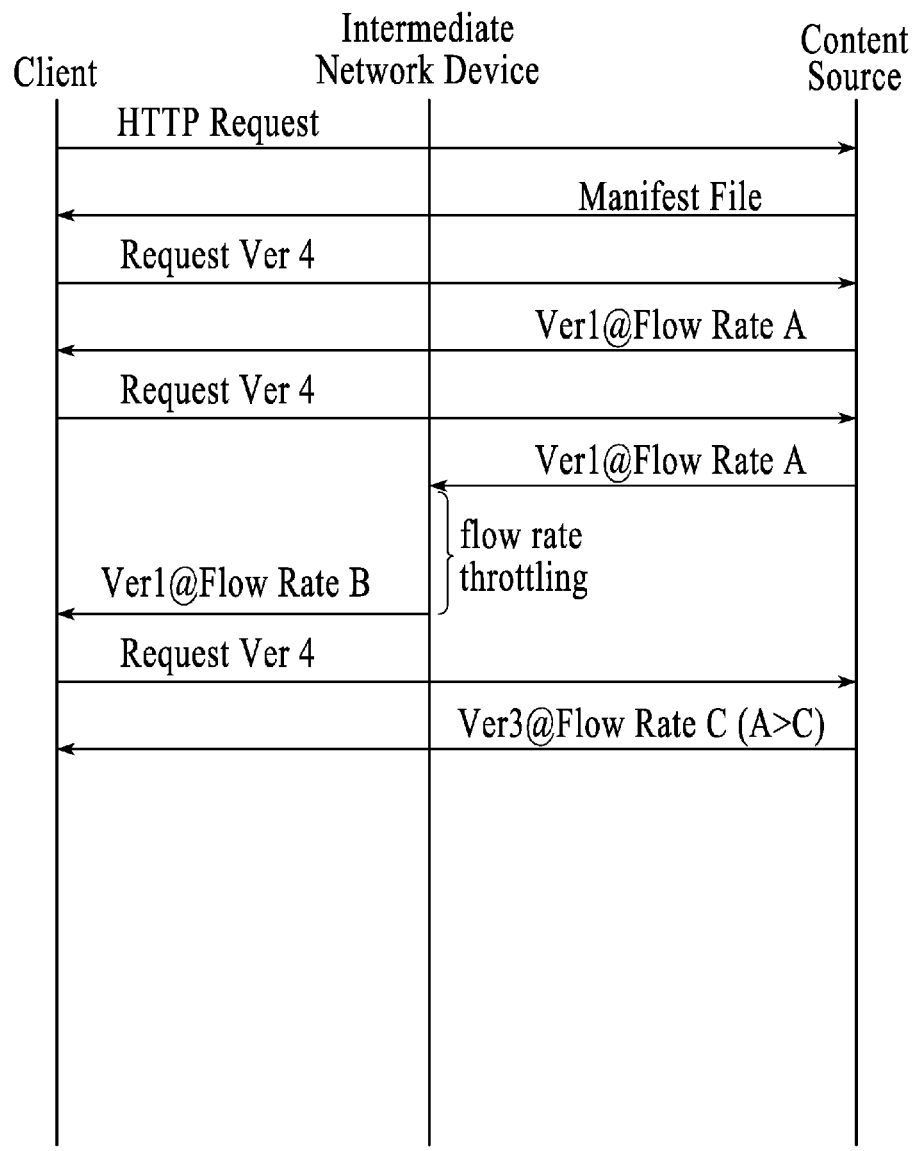
FIG. 6 illustrates message interactions between the client, the intermediate network device, and the content source in accordance with an embodiment of the invention.

FIG. 6 illustrates message interactions between the client, the intermediate network device, and the content source in accordance with an embodiment of the invention. Initially, the client makes a request for a content element, for example, an HTTP request that is triggered by clicking on a link. The request is provided to the content source and may or may not pass through the intermediate network device on its way to the content source using one of the URIs in the manifest file. In response to the request, the content source sends a manifest file to the client. The client selects a version of the content element and sends an HTTP request for the content element to the content source. As is known in HTTP adaptive bit rate streaming, the content element is requested and provided in content chunks, e.g., 2-10 second segments of the content element. The content chunks are sent to the client at a flow rate that is at least partially dependent on the version of the content element. For example, data for a version that is encoded at a higher bit rate must be sent at a higher flow rate (e.g., in Kbps) than data for a version that is encoded at a lower bit rate. That is, the higher bit rate versions of the content element consume more bits per second of played out video than the lower bit rate versions of the content element and therefore, must be transmitted to the client at a higher transmission rate.

With reference to FIG. 6, chunks of the content element are sent to the client at flow rate A. In the embodiment of FIG. 6, the intermediate network device is in a data path between the content source and the client and receives the content chunks at flow rate A. This process of requesting content chunks and returning content chunks can continue in a steady state at flow rate A. In order to influence the version of the content element that is requested by the client, the intermediate network device can change the flow rate at which content chunks are sent from the intermediate network device to the client. For example, instead of sending the content chunks from the intermediate network device to the client at flow rate A, the intermediate network device can reduce or "throttle" the flow rate to a lower flow rate, e.g., flow rate B. FIG. 6 illustrates the requested content chunks being sent to the client from the intermediate network device at flow rate B instead of flow rate A as a result of the throttling. Because flow rate B is less than flow rate A, the client will notice a change in some parameter. For example, the client will notice that the chunk download times have increased, that a buffer is less full, and/or that it takes longer to render frames. In response to the client noticing that a parameter has changed, the client may select a different version of the content element in subsequent HTTP requests. For example, the client will likely adapt to the change by selecting a version of the content element that is encoded at a lower bit rate than the current version. FIG. 6 illustrates that the client has "adapted" to request version 3 of the content element instead of version 1. Because version 3 of the content element has a lower bit rate than version 1, the content chunks can be sent to the client at a lower flow rate than flow rate A. For example, the content chunks of version 3 are sent to the client at flow rate C, which is less than flow rate A. In this way, the intermediate network device can reduce the amount of data that is flowing through the network, particularly, the wireless communications network, by influencing the client to select a version of the content element that is encoded at a lower bit rate.

Figure 7:
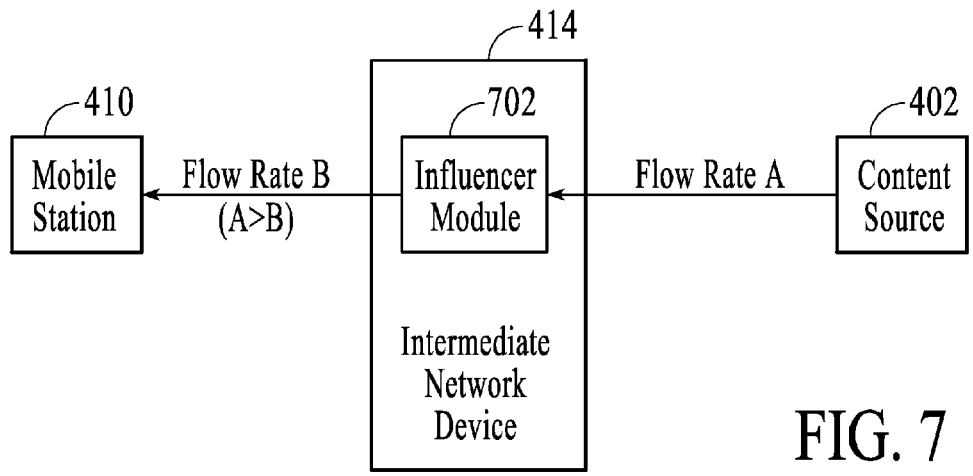
FIG. 7 depicts an embodiment of the intermediate network device that includes an influencer module.

FIG. 7 depicts an embodiment of the intermediate network device 414 that includes an influencer module 702. The influencer module is configured to control the flow rate of content chunks from the intermediate network device to the client 410 as described above. In a normal steady state condition, the intermediate network device receives content chunks from the content source 402 and sends the content chunks to the client at basically the same rate. That is, the intermediate network device sends the content chunks at basically the same rate at which the content chunks are received so that content chunks do not accumulate in the influencer module. However, in order to influence the client as described above, the influencer module can change the rate at which content chunks are sent from the intermediate network device to the client. For example, the intermediate network device can reduce the flow rate of content chunks from flow rate A to flow rate B, where A is greater than B. In an embodiment, the intermediate network device includes a buffer that enables the content chunks to be buffered to accommodate the difference in the flow rates. In an embodiment, the intermediate network device is located in a data path between the Internet and the wireless interface to the mobile stations. For example, the intermediate network device may be located at the data flow controller 180 of FIG. 1A, at the analyze-assess-control function 166 of FIG. 1B, or at the data intermediation module 220 of FIG. 2.

Figure 8:
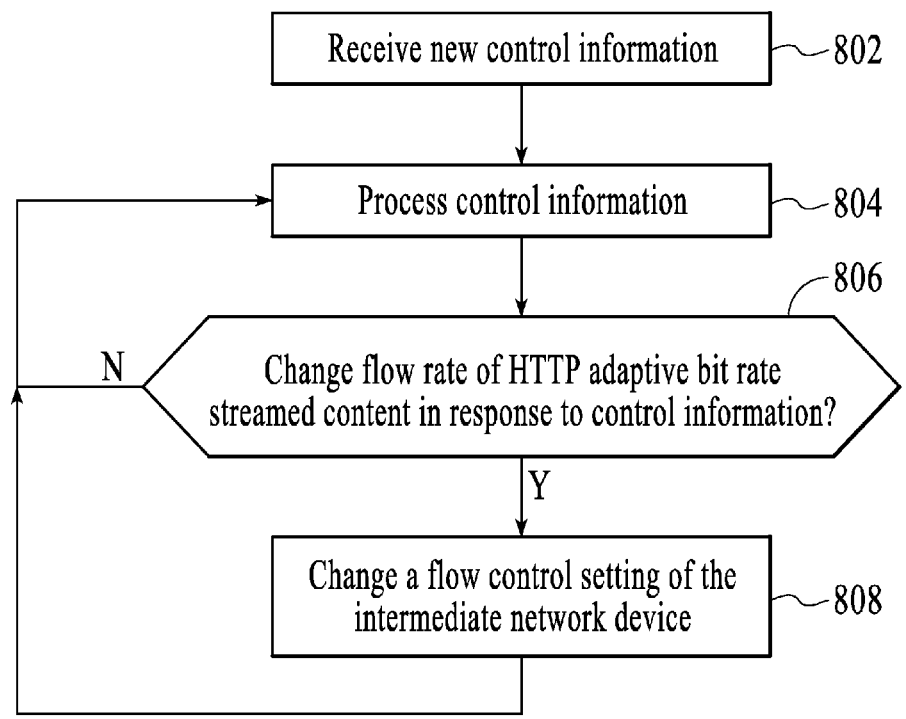
FIG. 8 is a process flow diagram of a method for controlling the streaming of content through a network.

FIG. 8 is a process flow diagram of a method for controlling the streaming of content through a network. At block 802, control information is received at the intermediate network device. The control information may include, for example, traffic metrics, traffic rules, and/or target traffic conditions. At block 804, the control information is processed by the intermediate network device. At decision point 806, it is determined whether or not the flow rate of content chunks, which are being streamed using an HTTP adaptive bit rate streaming protocol, should be changed in response to the control information. If it is determined that the flow rate is not going to be changed, the processes returns to block 804. If it is determined that the flow rate is to be changed, then at block 808 a flow control setting of the intermediate network device is changed accordingly. For example, a flow control setting of the influencer module 702 is set to change the flow rate. Once the flow control setting is changed, the process returns to block 804.

In an embodiment, flow rate control can be implemented on a per-client basis. In other embodiments, flow rate control can be implemented based on other criteria, including, for example, data type, data source, time of day, traffic conditions on the network, subscriber service level, subscriber location, cell ID, priority, etc. Further, the above-described flow rate control technique can be implemented on content that is streamed in an encrypted format, e.g., secure HTTP or HTTPS. In an embodiment, flow rate control can be implemented at the intermediate network device using various rate control techniques, such as for example, token based rate shaping. In an embodiment, the flow rate may be reduced by delaying the transmission of TCP SYN packets in the case of a TCP/IP network effectively simulating a lower available bandwidth.

In addition to reducing the flow rate, intermediate network devices can be configured to increase the flow rate (or at least pull back on the throttling) of content chunks in order to influence the client to select a version of the content that is encoded at a higher bit rate.

In another embodiment, a technique for controlling the streaming of content involves editing the manifest file that is used to implement an HTTP adaptive bit rate streaming protocol. For example, a manifest file is received at an intermediate network device in response to a request from a client for a content element, the manifest file is edited at the intermediate network device, and then the edited manifest file is sent to the client. In an embodiment, editing the manifest file involves deleting and/or inserting a URI within the manifest file. For example, a URI that identifies a version of the content element that is encoded at a relatively high bit rate can be deleted from the manifest file so that the client does not have the option of requesting the high bit rate version of the content element. In another example, a URI that identifies a version of the content element that is encoded at a relatively low bit rate can be inserted into the manifest file so that the client has the option of requesting the low bit rate version of the content element. In still another example, a wireless service provider may insert a new URI into the manifest file that identifies a version of the content element that has been optimized by the wireless service provider for streaming to the client. Having the ability to edit the manifest file at an intermediate network device enables the operator of a network, such as a wireless service provider, to have some control over the versions of content elements that are streamed to the clients using HTTP adaptive bit rate streaming. Accordingly, the technique provides the operator of a communications network (e.g., a wireless service provider) with a valuable tool to control network traffic volumes. The technique is also transparent to the client and to the content source and does not require any additional hardware or software to be installed at the content provider or at the client beyond what is already necessary to implement an HTTP adaptive bit rate streaming protocol.

Figure 9:
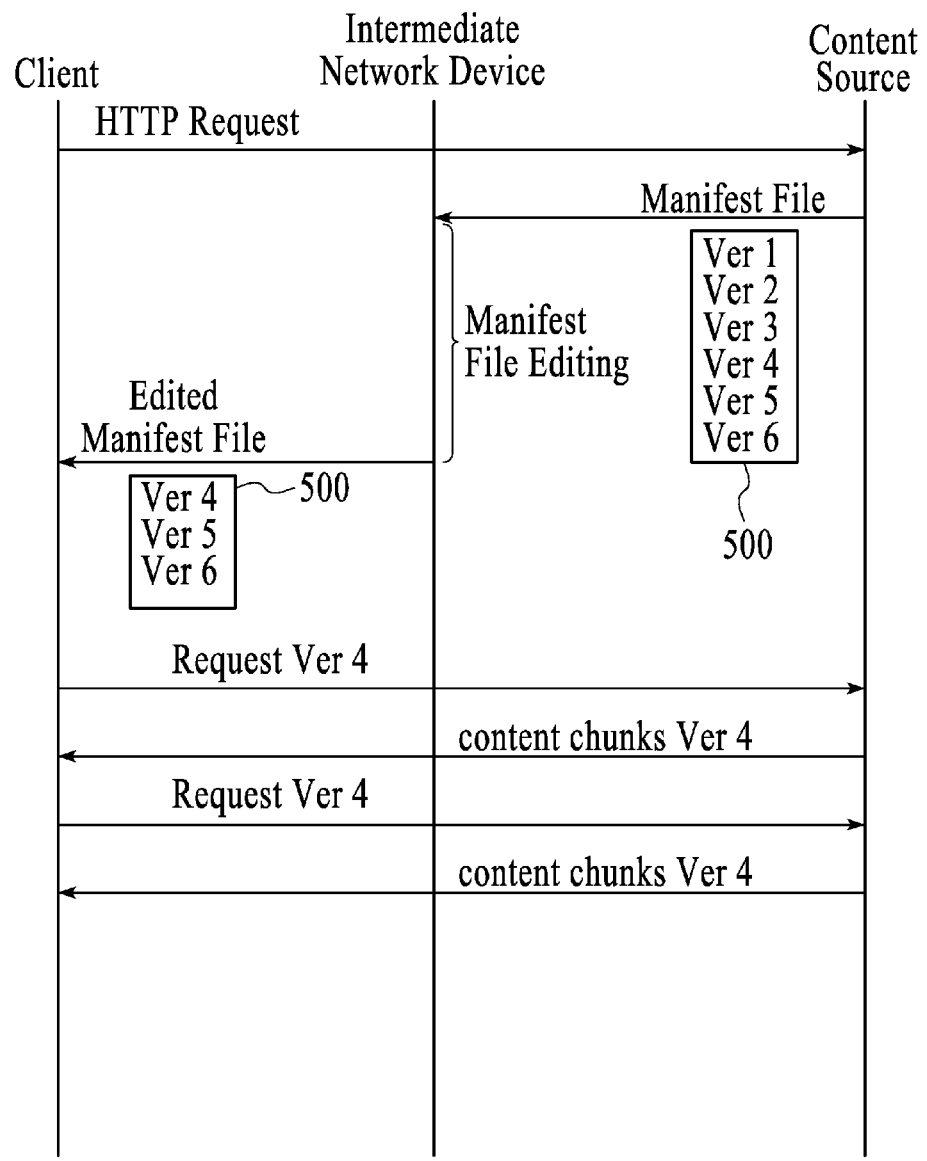
FIG. 9 illustrates message interactions between the client, the intermediate network device, and the content source in accordance with an embodiment of the invention.

FIG. 9 illustrates message interactions between the client, the intermediate network device, and the content source in accordance with an embodiment of the invention. Initially, the client makes a request for a content element, for example, an HTTP request that is triggered by clicking on a link. The request is received by the content source and may or may not pass through the intermediate network device. In response to the request, the content source sends a manifest file 500 to the client. The manifest file is received by the intermediate network device on its way to the client. In an embodiment, the intermediate network device recognizes the manifest file by looking into the HTTP response and identifying the manifest file name. Once the manifest file is recognized by the intermediate network device, the intermediate network device edits the contents of the manifest file. For example, the intermediate network device edits the manifest file by deleting at least one URI from the manifest file. With reference to FIG. 9, the intermediate network device edits the manifest file by deleting versions 1-3 of the content element as depicted in FIGS. 4 and 5. The edited version of the manifest file is then sent on to the client for use by the client in HTTP adaptive bit rate streaming. Because versions 1-3 of the content element have been removed from the manifest file, the client is not able to request any of versions 1-3 of the content element. Therefore, the client is left to select from only versions 4-6 of the content element. In the example of FIG. 9, the client selects version 4 of the content element and content chunks in version 4 are returned to the client from the content source.

Figure 10:
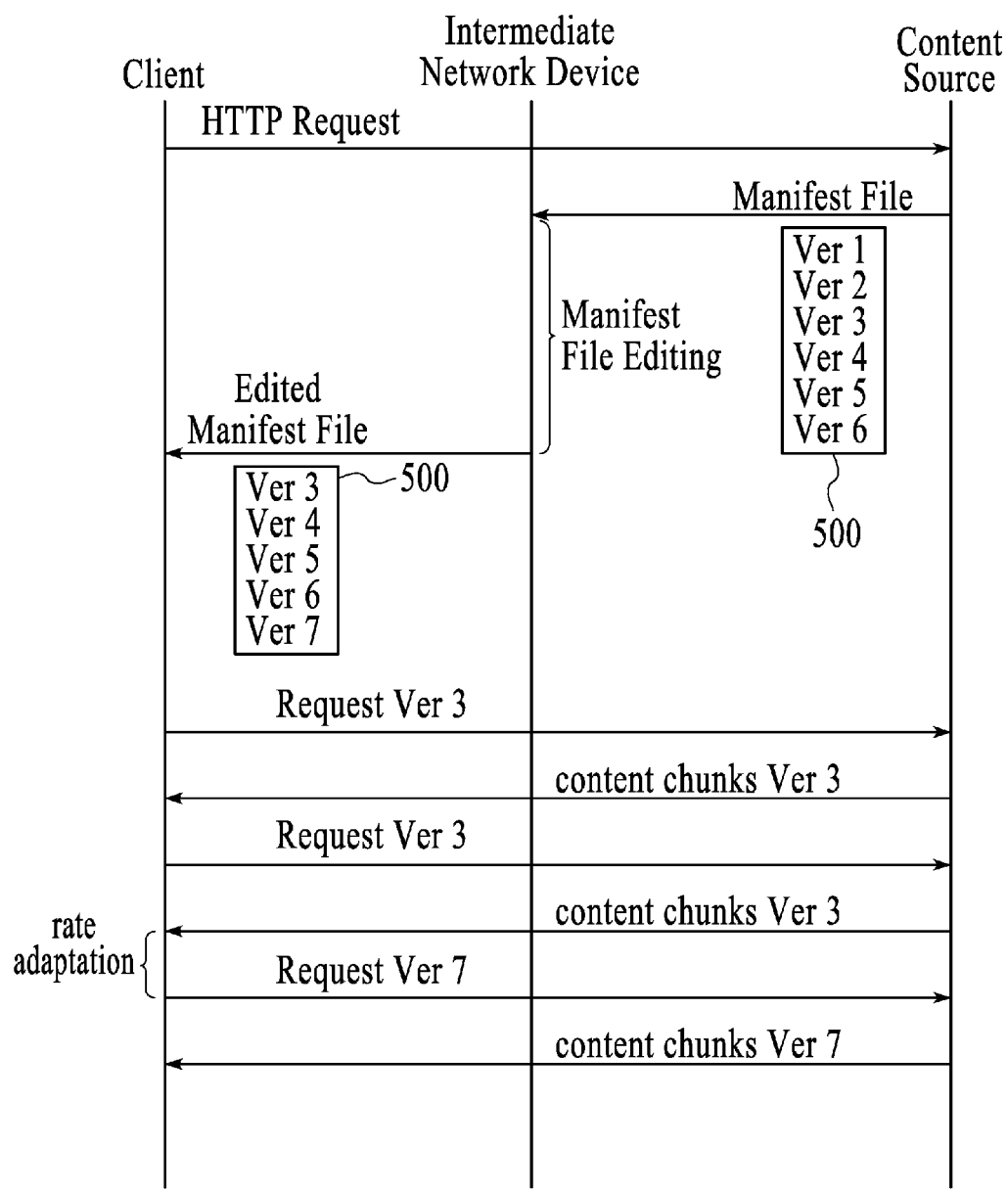
FIG. 10 illustrates an example, in which the manifest file is edited to delete versions 1 and 2 and to add version 7.

The manifest file 500 can be edited in various different ways to control the set of available versions from which the client can select. For example, the intermediate network device 414 can delete one or more URIs and/or add one or more URIs. FIG. 10 illustrates an example, in which the manifest file is edited to delete versions 1 and 2 and to add version 7. The edited manifest file is sent to the client from the intermediate network device, thereby changing the set of versions from which the client can select, from versions 1-6 to versions 3-7. FIG. 10 illustrates that the client initially requests content chunks in version 3 of the content element. However, in response to conditions that are sensed by the client, the client may adapt to the sensed conditions and request content chunks in a different version. For example, the client may request content chunks in version 7, which is a version of the content element that was added by the intermediate network device.

In an embodiment, the intermediate network device 414 may add a version of the content element that is supplied by the operator of the network, e.g., the wireless service provider. For example, the wireless service provider may generate a version of the content element that is optimized (e.g., with special transcoding) for the service provider network and may store and/or cache the version locally. For example, the wireless service provider may cache the optimized version within a device that is part or, or local to, the wireless communications network. In an embodiment, the wireless service provider may generate more than one optimized version of the content element. In this way, the service provider has the ability to customize the content format to meet specific specifications of the wireless service provider.

Figure 11:
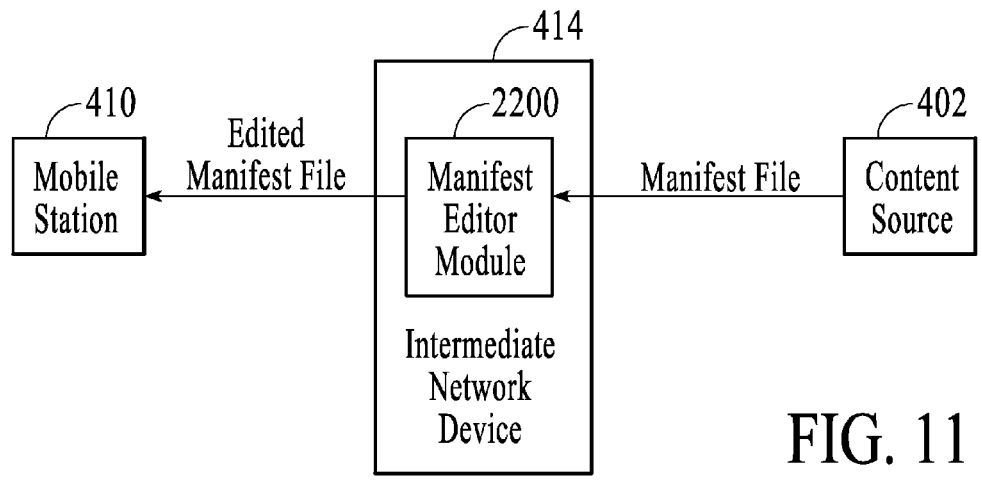
FIG. 11 depicts an embodiment of the intermediate network device that includes a manifest editor module.

FIG. 11 depicts an embodiment of the intermediate network device 414 that includes a manifest editor module 1100. The manifest editor module is configured to control the editing of the manifest files 500 as described above. Functions performed by the manifest editor include, for example, recognizing the manifest files and editing the manifest files. In an embodiment, the intermediate network device is located between the Internet and the wireless interface to the mobile stations. For example, the intermediate network device may be located at the data flow controller 180 of FIG. 1A, at the analyze-assess-control function 166 of FIG. 1B, or at the data intermediation module 220 of FIG. 2.

Figure 12:
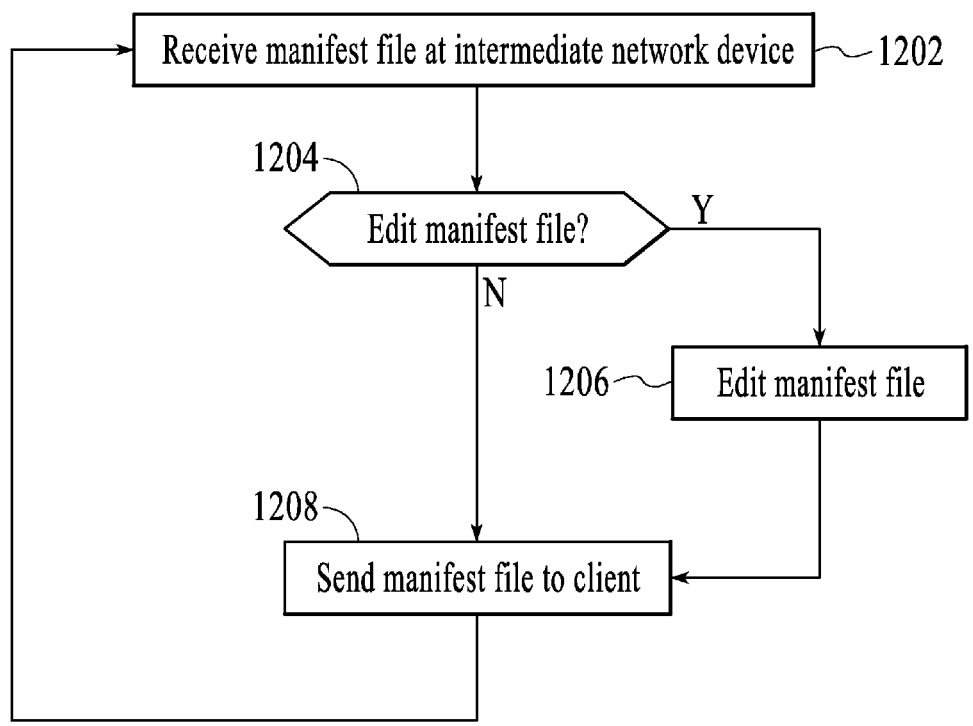
FIG. 12 depicts a process flow diagram of a method for controlling the streaming of content through a network.

FIG. 12 depicts a process flow diagram of a method for controlling the streaming of content through a network. At block 1202, a manifest file is received at an intermediate network device in response to a request from a client for a content element according to an HTTP adaptive bit rate streaming protocol. At decision point 1204, it is determined whether or not to edit the manifest file. If the manifest file is to be edited, at block 1206, the manifest file is edited at the intermediate network device, for example, by deleting or inserting at least one URI. At block 1208, the manifest file (edited or unedited) is sent to the client.

In an embodiment, the decision of when and how to throttle traffic and/or when and how to edit the manifest file are administered through a Policy Management system or Policy server. Using throttling and/or manifest file editing as described above effectively makes these schemes a tool to enforce policies on traffic that is streamed using an HTTP adaptive bit rate streaming protocol.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 13:
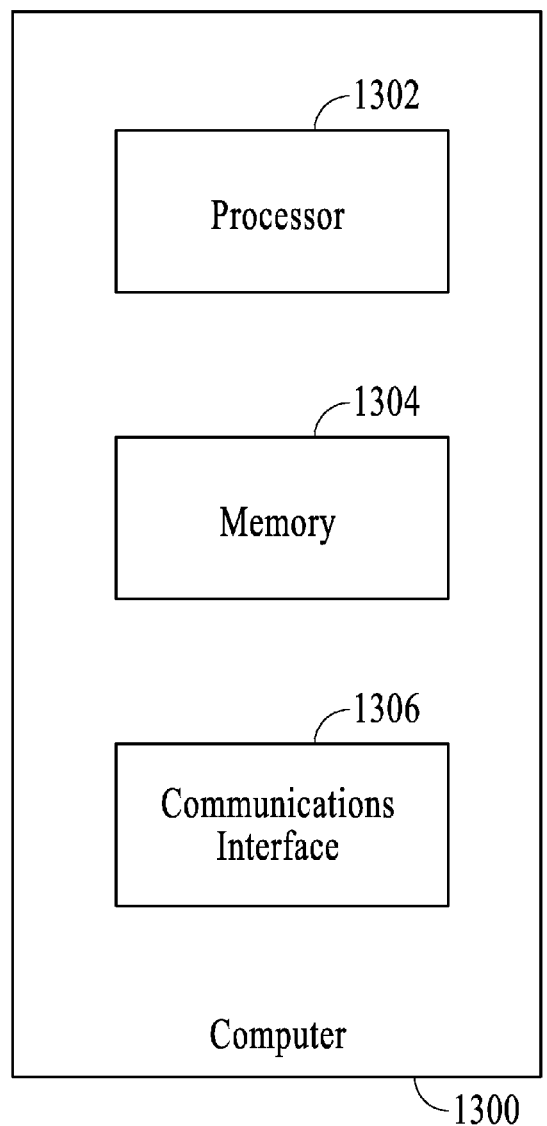
FIG. 13 depicts a computer that includes a processor, memory, and a communications interface.

In an embodiment, the functionality of the intermediate network device is performed by a computer, such as a router or server, which executes computer readable instructions. FIG. 13 depicts a computer 1300 that includes a processor 1302, memory 1304, and a communications interface 1306. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for controlling the streaming of content through a network, the method comprising:
   receiving a manifest file at an intermediate network device, the intermediate network device being in a data path between a content source and a client, the manifest file being received at the intermediate network device in response to a request from a client for a content element according to an HTTP adaptive bit rate streaming protocol, the manifest file including at least one Uniform Resource Identifier (URI) that identifies the content element;
   editing the manifest file at the intermediate network device; and
   sending the edited manifest file to the client.

2. The method of claim 1, wherein editing the manifest file comprises inserting a new URI, which identifies the content element, into the manifest file.

3. The method of claim 2, wherein the new URI identifies a different version of the content element.

4. The method of claim 3, wherein the different version of the content element is a version of the content element that is encoded at a bit rate that is different from the bit rates of other versions of the content element.

5. The method of claim 1, wherein editing the manifest file comprises deleting a URI from the manifest file.

6. The method of claim 1, wherein the manifest file is edited to influence traffic volumes in the network.

7. A system for controlling the streaming of content through a network, the system comprising:
   an intermediate network device located in a path between a content source and a client, the intermediate network device being configured to receive a manifest file from the content source and to send the manifest file to the client, the manifest file being received at the intermediate network device in response to a request from the client for a content element according to an HTTP adaptive bit rate streaming protocol, the manifest file including at least one Uniform Resource Identifier (URI) that identifies the content element; and
   the intermediate network device having a manifest editor module configured to identify the manifest file and to edit the manifest file before the manifest file is sent to the client.

8. The system of claim 7, wherein the manifest editor module is configured to insert a new URI, which identifies the content element, into the manifest file.

9. The system of claim 8, wherein the new URI identifies a different version of the content element.

10. The system of claim 9, wherein the different version of the content element is a version of the content element that is encoded at a bit rate that is different from the bit rates of other versions of the content element.

11. The system of claim 7, wherein the manifest editor module is configured to delete a URI that identifies the content element.

* * * * *